(12) United States Patent
Hosoda et al.

(10) Patent No.: US 12,047,900 B2
(45) Date of Patent: Jul. 23, 2024

(54) POSITIONING REQUEST METHOD, POSITIONING REQUEST DEVICE AND POSITIONING REQUEST PROGRAM

(71) Applicant: NIPPON TELEGRAPH AND TELEPHONE CORPORATION, Tokyo (JP)

(72) Inventors: Masamichi Hosoda, Musashino (JP); Maiko Naya, Musashino (JP); Akira Nakayama, Musashino (JP); Masaru Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 307 days.

(21) Appl. No.: 17/596,634

(22) PCT Filed: Jun. 17, 2019

(86) PCT No.: PCT/JP2019/023914
§ 371 (c)(1),
(2) Date: Dec. 15, 2021

(87) PCT Pub. No.: WO2020/255210
PCT Pub. Date: Dec. 24, 2020

(65) Prior Publication Data
US 2022/0303938 A1 Sep. 22, 2022

(51) Int. Cl.
*H04W 4/02* (2018.01)
*G01S 5/02* (2010.01)
*H04W 64/00* (2009.01)

(52) U.S. Cl.
CPC .................... *H04W 64/00* (2013.01)

(58) Field of Classification Search
CPC .. H04W 64/00; H04W 64/003; H04W 64/006
See application file for complete search history.

(56) References Cited

U.S. PATENT DOCUMENTS

| 2004/0189522 | A1* | 9/2004 | Watanabe | G01S 5/021 342/387 |
| 2005/0197096 | A1* | 9/2005 | Yang | H04W 76/50 455/404.1 |
| 2007/0173264 | A1* | 7/2007 | Duan | H04W 12/02 455/456.1 |

FOREIGN PATENT DOCUMENTS

| JP | 2007519346 A | 7/2007 |
| JP | 2008544627 A | 12/2008 |

OTHER PUBLICATIONS

Seigo Ito and Nobuo Kawaguchi, Bayesian based location estimation system using wireless LAN, Third IEEE International Conference on Pervasive Computing and Communications Workshops, Mar. 8, 2005.

(Continued)

*Primary Examiner* — Moustapha Diaby
(74) *Attorney, Agent, or Firm* — Harness, Dickey & Pierce, P.L.C.

(57) ABSTRACT

A wireless terminal station device, a plurality of wireless base station devices, and a positioning request device are included, the wireless terminal station device makes a positioning request including identification information of its own device to the positioning request device via the wireless base station device to which the wireless terminal station device belongs among the plurality of wireless base station devices, the positioning request device receives the positioning request from the wireless terminal station device, specifies the wireless base station device to which the wireless terminal station device belongs on the basis of the identification information of the wireless terminal station device, transmits a positioning instruction and the identification information of the wireless terminal station device to the specified wireless base station device, and receives a result of positioning of the wireless terminal station device (Continued)

from the wireless base station device, and the wireless base station device performs positioning of the wireless terminal station device corresponding to the received identification information and transmits the result of the positioning to the positioning request device. Accordingly, it is possible to obtain agreement of an owner and perform positioning of a terminal device without installing hardware or an application for measuring a geographical position in the terminal device.

8 Claims, 14 Drawing Sheets

(56) References Cited

OTHER PUBLICATIONS

Masamichi Hosoda et al., Wireless LAN Station Position Estimation Method by Access Point using Distributed Antenna System, FIT2018 (17th Information Science and Technology Forum) vol. 4, Sep. 19, 2018, pp. 59-64.

* cited by examiner

POSITIONING REQUEST METHOD, POSITIONING REQUEST DEVICE AND POSITIONING REQUEST PROGRAM

CROSS-REFERENCE TO RELATED APPLICATIONS

This application is a 371 U.S. National Phase of International Application No. PCT/JP2019/023914 filed on Jun. 17, 2019. The entire disclosures of the above applications are incorporated herein by reference.

TECHNICAL FIELD

The present invention relates to a technology for positioning a terminal device and using a result of the positioning without mounting hardware or an application for measuring a geographical position on a terminal device.

BACKGROUND ART

In recent years, terminal devices such as smartphones have been measuring geographical positions and using the results of measuring for various services. Global navigation satellite systems (GNSSs) such as a Global Positioning System (GPS) and a quasi-zenith satellite system "MICHIBIKI (registered trademark)" using a signal transmitted from an artificial satellite have become widespread as a technology for a terminal device to accurately measure a geographical position. Further, in a wireless communication system such as wireless local area network (LAN), Long Term Evolution (LTE), or a 5th generation mobile communication system (5G), an access point or wireless base station manages a terminal device belonging to the access point or wireless base station to provide communication services, and an access point or a wireless base station to which a specific terminal device belongs is found using the system such that it is possible to acquire a rough position of the terminal device. Further, a method in which a wireless LAN terminal such as a smartphone receives a signal transmitted from a nearby wireless LAN access point to accurately measure its own position is being studied (see, for example, NPL 1). Alternatively, a method in which a wireless LAN access point using distributed antennas accurately measures a position of a wireless LAN terminal such as a smartphone is known (see, for example, NPL 2).

CITATION LIST

Non Patent Literature

[NPL 1] S. Ito and N. Kawaguchi, "Bayesian based location estimation system using wireless LAN", Third IEEE International Conference on Pervasive Computing and Communications Workshops, Kauai Island, HI, 2005, pp. 273-278.doi: 10.1109/PERCOMW. 2005. 19

[NPL 2] Masamichi Hosoda, Hiroshi Sakamoto, Tomoki Murakami, Yasushi Hanakago, Makoto Umeuchi, Tadashi Mouri, Tomoaki Ogawa, Masaru Miyamoto, "Wireless LAN Terminal Position Estimation Method by Access Point Using Distributed Antenna System", FIT 2018 (17th Forum on Information Technology) Volume 4, pp. 59-64, September 2018.

SUMMARY OF THE INVENTION

Technical Problem

However, since it is necessary for a GNSS to receive signals from artificial satellites, it is difficult to use the GNSS at a place at which the sky is obstructed, such as indoors with a roof or outdoors along a street of buildings. Further, with a method of finding an access point or a wireless base station to which a terminal device belongs and knowing a position of the terminal device, it is possible to know the position of the terminal device even indoors when the access point or wireless base station is provided, but the position of the terminal device can be ascertained only with accuracy in units of installation of access points or wireless base stations. For example, when access points or wireless base stations are installed at intervals of 100 m, the terminal device can only know the position with accuracy of 100 m, and it is difficult to measure the position of the terminal device with finer accuracy.

When a GNSS using artificial satellites or the method of NPL 1 is used, a terminal device can perform positioning with fine accuracy, but it is necessary for the terminal device to have hardware and an application for positioning. Further, when an owner of the terminal device makes, for example, a service provision request including a rescue request to an operator or the like and the operator or the like takes an action according to the position of the terminal device, it is necessary for the terminal device to have a function of notifying the operator or the like of position information of the terminal device. These functions are generally often realized as an application that is installed on the terminal device such as a smartphone, and the owner of the terminal device must install the application in the terminal device in advance before making a request. However, there is a problem that not only when there is a high urgency such as a rescue request, but also when there is no high urgency, the owner of the terminal device has to perform an operation to install the application, which takes time and effort. Further, there is also a problem that an application having such functions often differs depending on an operating system (OS) or model of the terminal device, and it is necessary for an operator or the like to prepare an application corresponding to a wide variety of terminal devices.

In NPL 2, positioning can be performed with fine accuracy, it is not necessary for the terminal device to have a function of performing positioning, and it is not necessary for an application to be installed in a smartphone, but the owner of the terminal device cannot intentionally perform positioning of the device, but only performs positioning of a terminal device mainly designated by a wireless LAN access point side according to the convenience of an operator.

In this case, because a terminal device that is a positioning target is often owned personally by the owner, there is concern that an act of performing positioning of the terminal device without permission of the owner may be a privacy issue. In order to avoid this problem, a mechanism for requesting agreement to the positioning from the owner of the terminal device individually, and enabling the wireless LAN access point to perform positioning of the terminal device only when the agreement is obtained is necessary. In the method of NPL 2, identification information (a media access control (MAC) address, or the like) of the terminal device for which agreement of positioning has been obtained is registered in advance, and the positioning of the terminal device is performed. However, for example, in the case of a terminal device of which agreement of positioning has not been obtained in advance or a case in which the identification information of the terminal device is unknown, there is a problem that it is difficult for the wireless LAN access point to perform positioning of the terminal device.

An object of the present invention is to provide a positioning request method, a positioning request device, and a positioning request program capable of obtaining agreement of an owner and performing positioning of a terminal device without installing hardware or an application for measuring a geographical position in the terminal device.

Means for Solving the Problem

A positioning request method according to the present invention is a positioning request method for requesting positioning of a wireless terminal station device with the wireless terminal station device, a plurality of wireless base station devices, and a positioning request device, wherein the wireless terminal station device makes a positioning request including identification information of its own device to the positioning request device via the wireless base station device to which the wireless terminal station device belongs among the plurality of wireless base station devices, the positioning request device receives the positioning request from the wireless terminal station device, specifies the wireless base station device to which the wireless terminal station device belongs on the basis of the identification information of the wireless terminal station device, transmits a positioning instruction and the identification information of the wireless terminal station device to the specified wireless base station device, and receives a result of the positioning of the wireless terminal station device from the wireless base station device, and the wireless base station device receives the instruction of positioning of the wireless terminal station device and the identification information of the wireless terminal station device from the positioning request device, performs positioning of the wireless terminal station device corresponding to the received identification information, and transmits the result of the positioning to the positioning request device.

The positioning request device according to the present invention includes a reception unit configured to receive a positioning request from a wireless terminal station device; and a control unit configured to specify a wireless base station device to which the wireless terminal station device belongs on the basis of identification information of the wireless terminal station device, transmit a positioning instruction and the identification information of the wireless terminal station device to the specified wireless base station device, and receive a result of the positioning of the wireless terminal station device from the wireless base station device.

The positioning request program according to the present invention causes a computer to execute processing performed by the positioning request device.

Effects of the Invention

With the positioning request method, the positioning request device, and the positioning request program according to the present invention, it is possible to obtain agreement of an owner and perform positioning of a terminal device without installing hardware or an application for measuring a geographical position in the terminal device.

DESCRIPTION OF EMBODIMENTS

Hereinafter, embodiments of a positioning request method, a positioning request device, and a positioning request program according to the present invention will be described with reference to the drawings.

Figure 1:
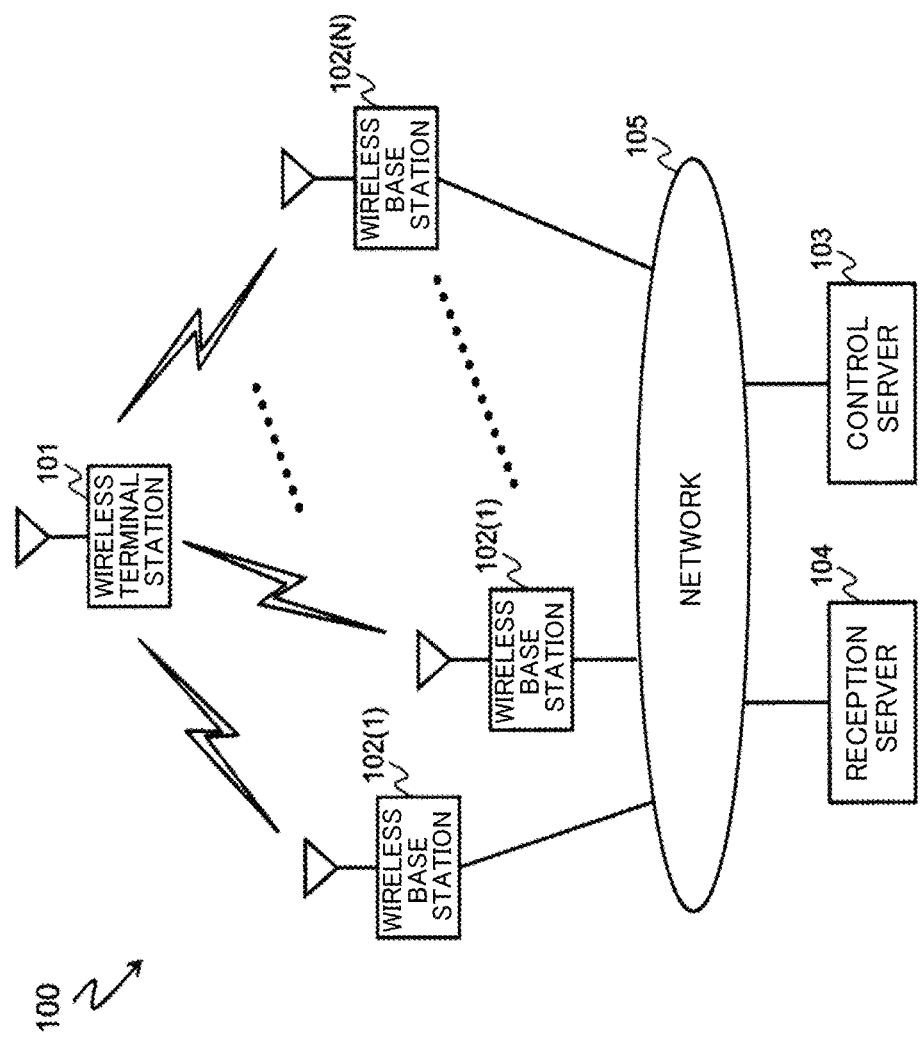
FIG. 1 is a diagram illustrating an example of a wireless communication system using a positioning request method according to the present embodiment.

FIG. 1 illustrates an example of a wireless communication system 100 using a positioning request method according to the present embodiment. The wireless communication system 100 includes a wireless terminal station 101, a wireless base station 102, a control server 103, and a reception server 104. In FIG. 1, the wireless base station 102 includes N (N is a positive integer) base stations including a wireless base station 102(1), a wireless base station 102(2), and a wireless base station 102(N), and is connected to the control server 103 and the reception server 104 via a network 105. The wireless communication system 100 corresponds to a system that realizes the positioning request method according to the present invention, and the control server 103 and the reception server 104 correspond to a positioning request device according to the present invention. Further, in the present embodiment, the wireless terminal station device is referred to as a wireless terminal station, and the wireless base station device is referred to as a wireless base station. Here, when description that is common to the wireless base stations 102(1) to 102(N) is given below, (number) after a reference sign is omitted and a notation "wireless base station 102" is used, and when a specific wireless base station 102 is indicated, (number) is added after the reference sign and, for example, notation such as "wireless base station 102(1)" is used.

Further, in FIG. 1, in order to measure a geographical position of the wireless terminal station 101, the plurality of wireless base stations 102 can measure RSSI, RTT, or the like of a predetermined signal received from the wireless terminal station 101 and perform positioning of the wireless terminal station 101. Alternatively, when one wireless base station 102 includes distributed antennas (antennas distributed and arranged at a plurality of different positions), one wireless base station 102 can perform positioning of the wireless terminal station 101 using the method of NPL 2. Description of a specific method for performing positioning of the wireless terminal station 101 using the method of NPL 2 will be omitted.

Figure 2:
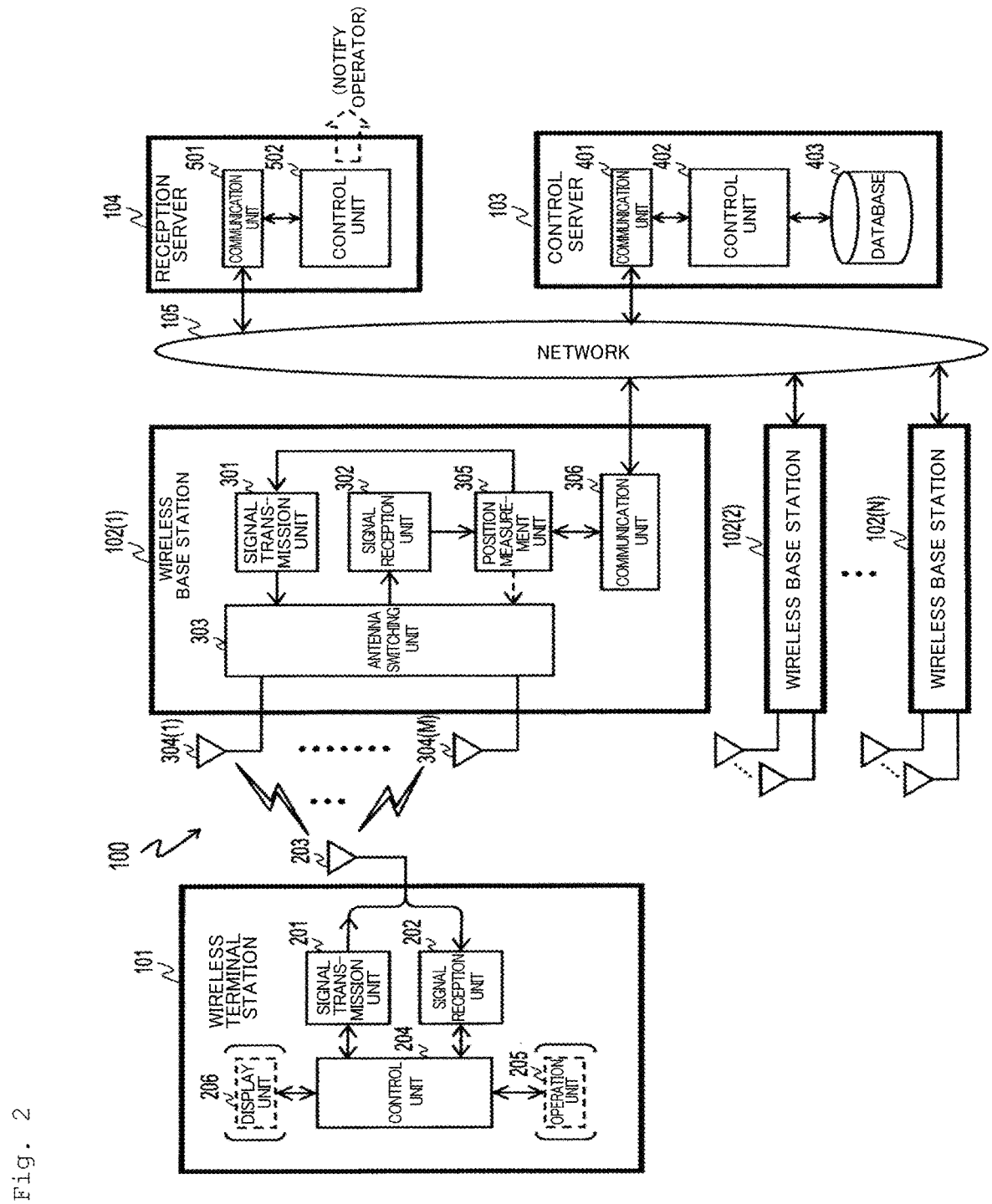
FIG. 2 is a diagram illustrating a configuration example of a wireless terminal station, a wireless base station, a control server, and a reception server using the positioning request method according to the present embodiment.

FIG. 2 illustrates a configuration example of the wireless terminal station 101, the wireless base station 102, the control server 103, and the reception server 104 that use the positioning request method according to the present embodiment. Here, in the present embodiment, the control server 103 and the reception server 104 are present as separate servers, but one server having the control server 103 as a control unit and the reception server 104 as a reception unit (corresponding to a positioning request device) may be configured. Hereinafter, when the control server 103 and the reception server 104 are collectively described, the control server 103 and the reception server 104 are referred to as a server side.

In FIG. 2, the wireless terminal station 101 includes a signal transmission unit 201, a signal reception unit 202, an antenna 203, a control unit 204, an operation unit 205, and a display unit 206. In a case in which a rescue request is made to the reception server 104 when a sensor or the like provided in the wireless terminal station 101 detects an abnormal situation, the positioning of the wireless terminal station 101 is agreed upon through the rescue request. When a request is made to the reception server 104 automatically by a sensor or the like, the operation unit 205 and the display unit 206 may be omitted in the wireless terminal station 101.

The signal transmission unit 201 converts transmission data output by the control unit 204 to a high-frequency signal and transmits the high-frequency signal from the antenna 203 to the wireless base station 102. The signal transmission unit 201 transmits a signal when the wireless terminal station 101 accesses the reception server 104 of the network 105 or a signal for position measurement when the wireless base station 102 performs positioning. Here, the signal for position measurement is a known specific signal in the wireless terminal station 101 and the wireless base station 102.

The signal reception unit 202 converts a high frequency signal received from the wireless base station 102 via the antenna 203 to reception data and outputs the reception data to the control unit 204. The signal reception unit 202 receives a signal when the wireless terminal station 101 accesses the reception server 104 of the network 105 or a signal for position measurement when the wireless base station 102 performs positioning.

The antenna 203 converts the transmission signal output by the signal transmission unit 201 to electromagnetic waves, transmits the electromagnetic waves to the wireless base station 102, converts electromagnetic waves arriving from the wireless base station 102 to a reception signal, and outputs the reception signal to the signal reception unit 202.

The control unit 204 outputs the transmission data to the signal transmission unit 201 to transmit the transmission data to the wireless base station 102, and receives the reception data from the wireless base station 102 from the signal reception unit 202. Here, the control unit 204 can connect to the reception server 104 via the wireless base station 102 to which the wireless terminal station 101 belongs (the wireless base station 102(1) in the example of FIG. 2) and communicate with the reception server 104.

The operation unit 205 can access the reception server 104 via the wireless base station 102 to which the owner belongs and make a service provision request. Here, the service provision request includes a request for positioning of the wireless terminal station 101, and agreement of the owner to acquisition of privacy information (position information or the like) of the operator side. For example, when the reception server 104 is a web server, the owner of the wireless terminal station 101 can start an application of a general browser installed in the wireless terminal station 101 from the beginning, and access the Internet using the operation unit 205 and the display unit 206. When the wireless terminal station 101 is a smartphone, the operation unit 205 is configured of a touch panel integrated with the display unit 206, and the owner taps a button or the like displayed on a screen of the display unit 206 to perform an operation.

The display unit 206 displays information used for the owner to operate the wireless terminal station 101. For example, a menu of food that is provided by the operator is displayed on a screen of a web browser. Alternatively, a request for positioning of the wireless terminal station 101 is made to the reception server 104, and a current location is displayed on a map simply by displaying the map and tapping a current location button. When the wireless terminal station 101 does not need an operation or display of an in-vehicle device or the like linked to an airbag or an impact sensor of a vehicle, the operation unit 205 or the display unit 206 may be omitted. Alternatively, only one of the operation unit 205 and the display unit 206 may be mounted.

Thus, the wireless terminal station 101 according to the embodiment does not need to be equipped with hardware such as a GNSS or software such as a position measurement application, and makes a positioning request to the reception server 104, so that various services using the position information can be received or a current location can be known, and a privacy problem is solved.

In FIG. 2, the wireless base station 102(1) includes a signal transmission unit 301, a signal reception unit 302, an antenna switching unit 303, an antenna 304, a position measurement unit 305, and a communication unit 306. Here, the wireless base station 102(1) is a base station to which the wireless terminal station 101 belongs, and the wireless base station 102(2) to the wireless base station 102(M) are configured like the wireless base station 102(1). Further, the antenna 304 is configured of M distributed antennas (M is a positive integer) from an antenna 304(1) to an antenna 304(M).

The signal transmission unit 301 converts the transmission data output by the position measurement unit 305 to a high-frequency signal and transmits the high-frequency signal from the antenna 304 selected by the antenna switching unit 303 to the wireless terminal station 101. When the wireless terminal station 101 accesses the reception server 104 of the network 105, the signal transmission unit 301 transmits a signal transmitted from the reception server 104 to the wireless terminal station 101 or a signal for position measurement when positioning of the wireless terminal station 101 is performed, to the wireless terminal station 101.

The signal reception unit 302 converts the high frequency signal received from the wireless terminal station 101 via the antenna 304 selected by the antenna switching unit 303 to reception data and outputs the reception data to the position measurement unit 305. When the wireless terminal station 101 accesses the reception server 104 of the network 105, the signal reception unit 302 receives a signal transmitted from the wireless terminal station 101 to the reception server 104 or the signal for position measurement when positioning of the wireless terminal station 101 is performed from the wireless terminal station 101.

The antenna switching unit 303 includes a changeover switch for selecting any one of the M antennas 304 and transmitting or receiving a signal, and is controlled by the position measurement unit 305. The antenna switching unit 303 transmits or receives the signal for positioning the wireless terminal station 101 from or to each antenna 304 while switching the M antennas 304 having different positions.

The antenna 304 converts the transmission signal output by the signal transmission unit 301 to electromagnetic waves, transmits the electromagnetic waves to the wireless terminal station 101, converts the electromagnetic waves arriving from the wireless terminal station 101 to a reception signal, and outputs the reception signal to the signal reception unit 302.

When the position measurement unit 305 receives an instruction of positioning of the wireless terminal station 101 belonging to the wireless base station 102 from the control server 103, the position measurement unit 305 selects the antenna 304 using the antenna switching unit 303, performs transmission or reception of a signal for position measurement to or from the wireless terminal station 101, and measures RSSI, RTT, or the like. It is possible to position the wireless terminal station 101 on the basis of the RSSI or RTT measured by each of the M antennas 304 having different installation positions (see, for example, NPL 2). When the wireless base station 102 can use a plurality of communication schemes such as a wireless LAN, LTE, and 5G, the wireless terminal station 101 may be positioned using each of the plurality of communication schemes, and a result integrated by performing statistical processing (average, or the like) on results of respective positioning may be returned to the control server 103. Alternatively, the wireless base station 102 may reply to the control server 103 with a result integrated by performing weighting depending on basic positioning accuracy according to each of the communication schemes, positioning accuracy on the basis of a positional relationship or the like between the wireless terminal station 101 and the wireless base station 102, positioning accuracy according to a state of interference waves in a radio section, or the like, and then performing statistical processing. Further, when the accuracies of the respective communication schemes greatly differ, the wireless base station 102 may perform positioning of the wireless terminal station 101 only using the scheme having the highest accuracy and reply with a result of the positioning to the control server 103. Alternatively, the wireless base station 102 may perform positioning of the wireless terminal station 101 using a scheme that requires less consumption of traffic, power, and battery for positioning so that a remaining battery level of the wireless terminal station 101 does not become severe, and reply with a result of the positioning to the control server 103.

The communication unit 306 performs communication with the reception server 104 and the control server 103 via the network 105. For example, the communication unit 306 transmits identification information of the wireless base station 102 to the control server 103 and also transmits identification information of the wireless terminal station 101 belonging to the wireless base station 102 to the control server 103. Further, the communication unit 306 receives an instruction of positioning of the wireless terminal station 101 belonging to the wireless base station 102 from the control server 103, and outputs the instruction to the position measurement unit 305. Further, the communication unit 306 transfers data that is communicated between the wireless terminal station 101 and a web server (the reception server 104 or the like) on the network 105. In this case, the data communicated between the wireless terminal station 101 and the web server passes through the position measurement unit 305 and is output from the communication unit 306 to the signal transmission unit 301 or from the signal reception unit 302 to the communication unit 306.

Thus, the wireless base station 102 can perform a process of relaying a signal when the wireless terminal station 101 accesses the reception server 104 or can perform the positioning of the wireless terminal station 101 and return a result of the positioning to the control server 103 when the wireless base station 102 receives an instruction of positioning of the wireless terminal station 101 from the control server 103.

In FIG. 2, the control server 103 includes a communication unit 401, a control unit 402, and a database 403.

The communication unit 401 performs communication with the plurality of wireless base stations 102 and the reception server 104 connected via the network 105. For example, the communication unit 401 receives a notification of the identification information of the wireless terminal station 101 that performs positioning from the reception server 104, and outputs the notification to the control unit 402. The communication unit 401 transmits the instruction of positioning of the wireless terminal station 101 input from the control unit 402 to the wireless base station 102 designated by the control unit 402. Similar to the wireless terminal station 101, the wireless base station 102 is managed by the database 403 using the identification information unique to the wireless base station 102, and the communication unit 401 performs communication with the wireless base station 102 with the identification information (such as a MAC address) of the wireless base station 102 as a transmission destination.

The control unit 402 is configured of a processor that has a predetermined program stored in an internal memory or the like and executes processing according to the program. The control unit 402 refers to data indicating the correspondence relationship between the wireless terminal station 101 and the wireless base station 102 stored in the database 403 on the basis of the identification information of the wireless terminal station 101 that performs positioning, which is output from the communication unit 401, to specify the wireless base station 102 to which the wireless terminal station 101 belongs. The control unit 402 transmits the instruction of positioning of the wireless terminal station 101 to the specified wireless base station 102, and receives a result of positioning the wireless terminal station 101, which is returned by the wireless base station 102. The control unit 402 transmits the positioning result received from the wireless base station 102 to the reception server 104.

The database 403 is a storage device that stores a correspondence relationship between the identification information of the plurality of wireless base stations 102 managed by the control server 103 and the identification information of the wireless terminal station 101 belonging to the wireless base station 102. Here, each wireless base station 102 has a function of reporting the identification information of the wireless terminal station 101 belonging to the wireless base station 102 to the control server 103 each time the wireless terminal station 101 newly belongs to the wireless base station 102. Accordingly, the control server 103 can know the identification information of the wireless terminal station 101 belonging to each wireless base station 102 that is managed by the control server 103. In the present embodiment, the database 403 stores a correspondence relationship between the wireless base station 102 and the wireless terminal station 101. However, the database 403 may hold only the identification information of the wireless base station 102 that is managed, and transmit the identification information of the wireless terminal station 101 to each wireless base station 102 to inquire about whether or not the wireless terminal station 101 belongs to the wireless base station 102 each time the reception server 104 notifies of the identification information of the wireless terminal station 101 including the positioning request. For example, when the reception server 104 and the wireless terminal station 101 are on the same L2 network, it is possible to specify the wireless base station 102 to which the wireless terminal station 101 belongs by finding the wireless base station 102 to which the MAC address of the wireless terminal station 101 belongs. Further, for example, when the reception server 104 and the wireless terminal station 101 are connected by an L3 network without network address translation (NAT), it is possible to specify the wireless base station 102 to which the wireless terminal station 101 belongs by finding the wireless base stations 102 to which an IP address of the wireless terminal station 101 belongs. For example, in the case of a system configuration in which an IP address or the like is converted by network devices on a route of the network 105, it is possible to specify the wireless base station 102 to which the wireless terminal station 101 belongs by tracking conversion content through tracing of the converting network devices in order. In this case, because the identification information is not changed in a period in which the wireless terminal station 101 belongs to the same wireless base station 102 even when the wireless terminal station 101 is anonymized or uses temporary identification information, valid identification information can be obtained at least in a period until the wireless terminal station 101 is disconnected from the wireless base station 102.

Thus, the control server 103 specifies the wireless base station 102 to which the wireless terminal station 101 belongs on the basis of the identification information of the wireless terminal station 101 that performs positioning, which is received from the reception server 104. The control server 103 can transmit the instruction of positioning of the wireless terminal station 101 to the wireless base station 102 and receive the result (position information) of the positioning of the wireless terminal station 101.

In FIG. 2, the reception server 104 includes a communication unit 501 and a control unit 502.

The communication unit 501 performs communication with the plurality of wireless base stations 102 and the control server 103 connected via the network 105. For example, the communication unit 501 receives a service provision request (corresponding to the positioning request) including the identification information from the wireless terminal station 101 and outputs the service provision request to the control unit 502.

The control unit 502 is configured of a processor that has a predetermined program stored in an internal memory or the like and executes processing according to the program. The control unit 502 notifies, from the communication unit 501, the control server 103 of the positioning request including the identification information of the wireless terminal station 101, which is output from the communication unit 501. The control unit 502 receives a result (position information) of the positioning of the wireless terminal station 101 from the control server 103. Here, the control unit 502 has a function of notifying the operator or the like of information on the service provision request received from the wireless terminal station 101 (for example, a function of displaying request content on the display unit or transmitting the request content to a wireless terminal of a person in charge).

Thus, the reception server 104 can receive the service provision request from the wireless terminal station 101, transmit the service provision request to the control server 103, and receive the position information of the wireless terminal station 101 from the control server 103.

Here, the reception server 104, for example, is installed by an operator or the like who provides a service to the owner of the wireless terminal station 101, and the owner intentionally makes a service provision request to thereby agree to the operator performing positioning of the wireless terminal station 101. The service that is provided by the operator is a service that uses the position of the wireless terminal station 101 and is, for example, a service of delivering an object requested by the owner to the current location or manually or automatically requesting rescue in emergency.

Further, in a service such as requesting rescue manually or automatically in emergency, for example, the owner simply accesses a web server (corresponding to the reception server 104) of an insurance company or security company and taps a rescue request button, such that the operator can dispatch a person in charge to the current location of the wireless terminal station 101. Alternatively, when the wireless terminal station 101 has a function of linking with an airbag or an impact sensor of a vehicle, the wireless terminal station 101 can automatically transmit a rescue request including the identification information of the wireless terminal station 101 to the reception server 104 at the time of an operation of the airbag or detection of impact. Accordingly, the owner of the wireless terminal station 101 can request rescue even when the owner cannot move or is unconscious. An application example of the service will be described in detail below.

Thus, with the wireless communication system 100 using the positioning request method according to the present embodiment, it is possible to receive a service according to the position of the wireless terminal station 101 while solving the privacy problem without dedicated hardware or a dedicated application for positioning mounted in the wireless terminal station 101.

Comparative Example

Figure 3:
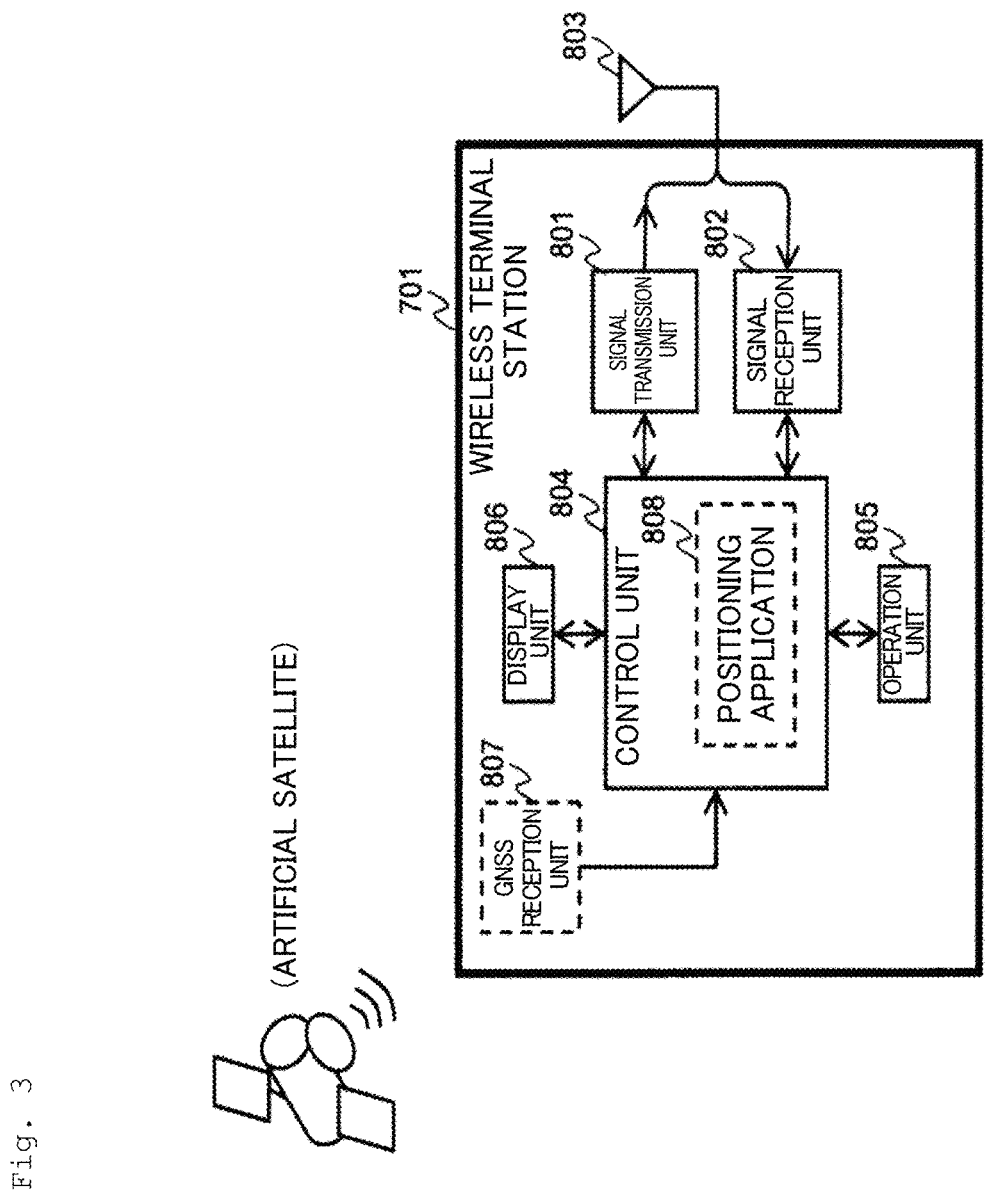
FIG. 3 is a diagram illustrating an example of a wireless terminal station of a comparative example.

FIG. 3 illustrates an example of a wireless terminal station 701 of a comparative example. The wireless terminal station 701 includes a signal transmission unit 801, a signal reception unit 802, an antenna 803, a control unit 804, an operation unit 805, a display unit 806, and a GNSS reception unit 807. Further, the control unit 804 needs software (positioning application 808) for notifying the operator or the like of position information of the own device. In general, because the software is not installed as a standard and is provided by, for example, each operator, it is necessary for the owner to install the software as necessary. In FIG. 3, the signal transmission unit 801, the signal reception unit 802, and the antenna 803 operate, similar to the signal transmission unit 201, the signal reception unit 202, and the antenna 203 of the wireless terminal station 101 according to the embodiment described in FIG. 2.

For the wireless terminal station 701 of the comparative example, it is necessary to operate the wireless terminal station 701 via the operation unit 805 and the display unit 806, measure position information of the own device using the GNSS reception unit 807, and make a service provision request including the measured position information to the operator or the like using the separately installed positioning application 808.

Further, in the method of NPL 2, when the GNSS reception unit 807 is not mounted, for example, a MAC address is registered as the identification information of the wireless terminal station 701 in advance, and positioning of the wireless terminal station 701 can be performed from the base station side, but it is necessary for the owner to register the MAC address in the operator or the like in advance. Further, in recent years, a wireless terminal station that randomly generates a MAC address and regularly changes the MAC address to perform anonymization for protection of privacy is known. In a case in which such a wireless terminal station uses the method of NPL 2, because the MAC address is changed in a certain period even when the MAC address is registered as the identification information in advance, it is difficult for the base station (for example, a wireless LAN access point) to perform positioning of the wireless terminal station. For Internet Protocol (IP) addresses, in the case of IPv4, it is often such a configuration that an IP address pooled according to a dynamic host configuration protocol (DHCP) is issued for each connection, and the same IP address may be issued to another wireless terminal station or another IP address may be issued to the same wireless terminal station. In the case of IPv6, use of a fixed IP address according to EUI-64 is not recommended, and use of a randomly generated address is defined as described in RFC 7217 and RFC 7721. Therefore, the IP address cannot be registered in advance as the identification information, and it is difficult for the wireless LAN access point to perform positioning of the wireless terminal station.

Here, it is sufficient to know a rough position of the wireless terminal station to provide only communication services and positioning with fine accuracy may not be necessary, but when the owner of the wireless terminal station makes a service provision request such as a rescue request or delivery of goods, positioning of the wireless terminal station with fine accuracy is performed such that the operator quickly takes an action and the owner of the wireless terminal station has an advantage. However, in the method of NPL 2, because the positioning signal is always communicated in a radio section for positioning of the wireless terminal station with fine accuracy, there is a problem that power consumption of the wireless terminal station is increased and a remaining battery level becomes low or traffic in the radio section is increased. Further, because a behavior of the owner of the wireless terminal station is known, a privacy problem arises.

Further, a wireless terminal station that automatically uploads some information such as traveling information of a vehicle or information of monitoring device may not have a positioning function or a function of notifying the operator or the like of a positioning result. In such a wireless terminal station, for example, there is problem that, when information for notifying of an abnormality is uploaded, it is difficult for the operator to know the position of the wireless terminal station even when knowing from the uploaded information that some action is necessary at a place at which the wireless terminal station is located.

Thus, in the wireless terminal station 701 of the comparative example, various problems are caused when the service using the position information is received.

On the other hand, the wireless terminal station 101 according to the present embodiment can obtain agreement of the owner, perform positioning of the wireless terminal station 101, and make the service provision request using the position information without installing hardware or an application for measuring a geographical position.

[Basic Sequence of Positioning Request Method]

Figure 4:
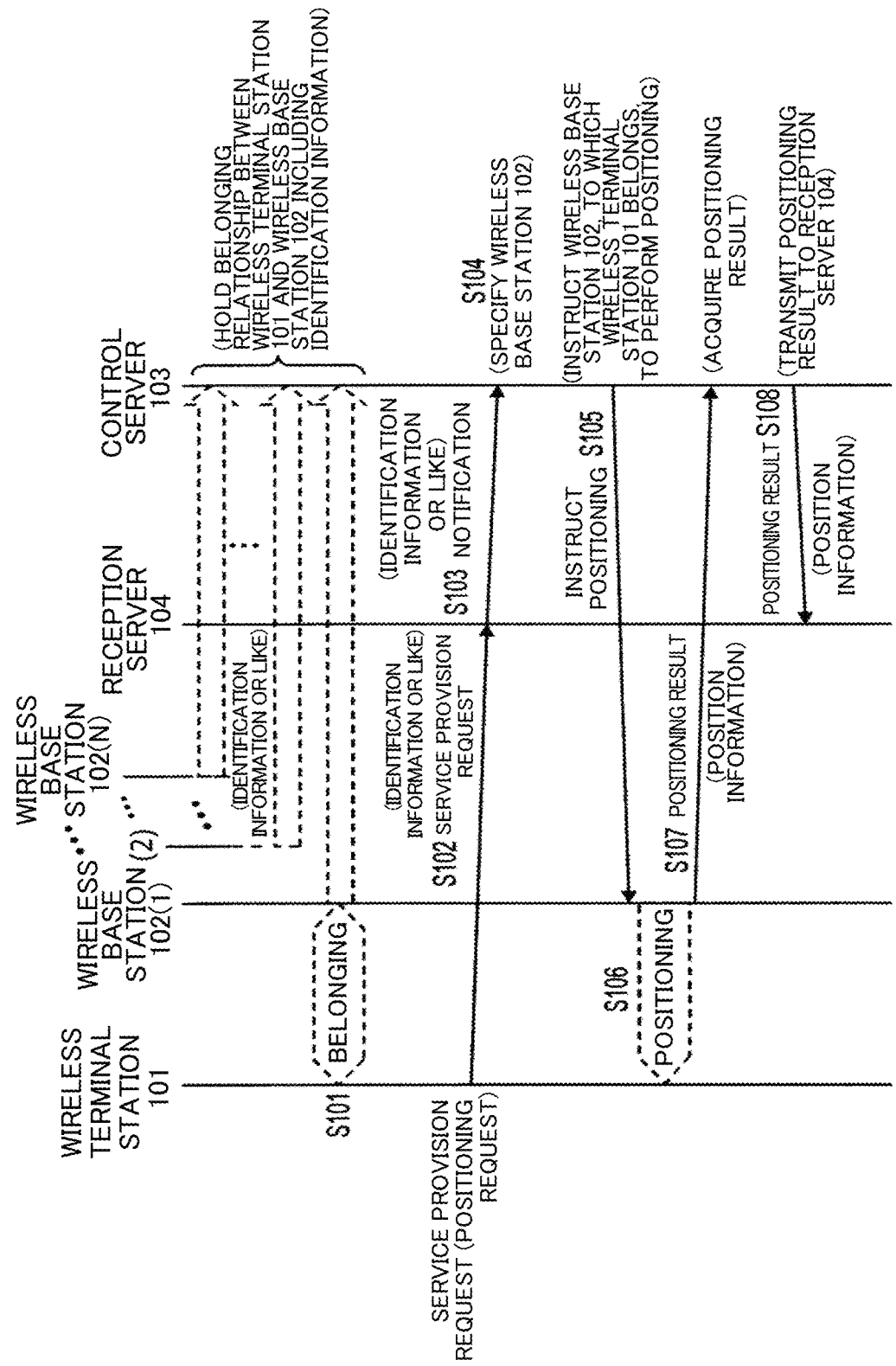
FIG. 4 is a diagram illustrating an example of a basic sequence of the positioning request method according to the present embodiment.

FIG. 4 illustrates an example of the basic sequence of the positioning request method according to the present embodiment. The basic sequence illustrated in FIG. 4 is executed by the wireless terminal station 101, the N wireless base stations 102, the control server 103, and the reception server 104 of the wireless communication system 100 described in FIG. 2.

In FIG. 4, the wireless terminal station 101 belongs to, for example, anyone (for example, the nearest wireless base station 102) of the N wireless base stations 102 and can connect to the network 105 through the wireless base station 102, and the wireless base station 102 can perform communication with the control server 103 or the reception server 104 via the network 105, as described with reference to FIG. 2.

Here, in the wireless communication system. 100 using the positioning request method according to the present embodiment, for example, the wireless terminal station 101 may be a wireless LAN terminal such as a smartphone, the wireless base station 102 may be a wireless LAN access point, and communication with the outside such as the Internet can be performed via a wireless LAN or a service can be received from an external businesses operator. Further, the wireless communication system 100 is not limited to the wireless LAN and may be a mobile communication system such as for LTE or 5G.

In FIG. 4, each wireless base station 102 transmits the identification information of its own device and the identification information of the wireless terminal station 101 belonging to the wireless base station 102 to the control server 103 each time the wireless terminal station 101 belongs to the wireless base station 102. Accordingly, the control server 103 can hold the identification information of the wireless terminal station 101 and each wireless base station 102, and a belonging relationship between each wireless base station 102 and the wireless terminal station 101. In the example of FIG. 4, the wireless terminal station 101 belongs to the wireless base station 102(1) (S101).

In this state, the owner of the wireless terminal station 101 transmits a some-service provision request to the reception server 104 via the wireless base station 102 to which the wireless terminal station 101 belongs (S102). The reception server 104 notifies the control server 103 of the positioning request including the identification information of the wireless terminal station 101 on the basis of the service provision request received from the wireless terminal station 101 (S103). The service provision request includes the identification information of the wireless terminal station 101, and the reception server 104 can know the identification information of the wireless terminal station 101 that has made the service provision request. Here, the identification information of the wireless terminal station 101 is, for example, information such as an IP address or MAC address of a transmission source included in a frame of the service provision request.

The control server 103 specifies the wireless base station 102 to which the wireless terminal station 101 belongs on the basis of the identification information of the wireless terminal station 101 notified of by the reception server 104 and the request for positioning (S104). The control server 103 transmits a positioning instruction including the identification information of the wireless terminal station 101 to the specified wireless base station 102 (S105). The wireless base station 102 that receives the identification information of the wireless terminal station 101 belonging to wireless base station 102 and the positioning instruction from the control server 103 positions the wireless terminal station 101 using a well-known method using distributed antennas or the like (S106). The wireless base station 102 returns position information obtained as a result of positioning the wireless terminal station 101 to the control server 103 (S107). The control server 103 acquires the position information of the wireless terminal station 101 from the wireless base station 102, and transmits the position information of the wireless terminal station 101 to the reception server 104 (S108).

Thus, the reception server 104 can acquire the position information of the wireless terminal station 101 that has made the service provision request, and provide a service using the position information of the wireless terminal station 101 through, for example, the operator or the like who manages the reception server 104. The wireless terminal station 101 is regarded as agreeing to the positioning through an action of making the service provision request to the reception server 104, and a privacy problem is solved. For example, when the owner of the wireless terminal station 101 makes the service provision request to the operator or the like, the service provision request is transmitted to the reception server 104 through the wireless terminal station 101. In this case, when the reception server 104 is a web server, a service provision request button is tapped on a general-purpose web browser of the wireless terminal station 101 such that the service provision request can be transmitted to the reception server 104, and agreement to positioning can be obtained through an action of tapping the request button.

Application Example (1)

Figure 5:
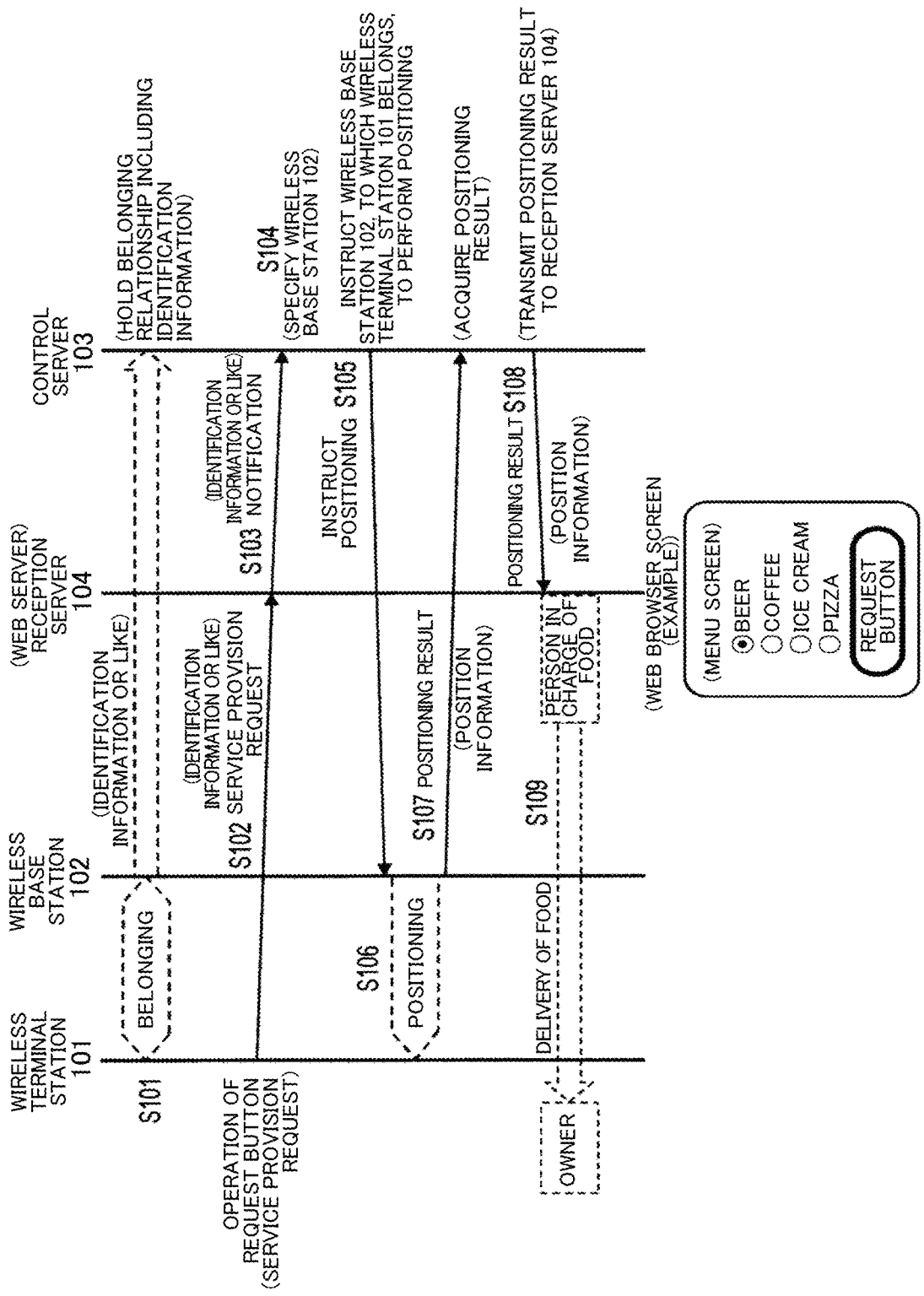
FIG. 5 is a diagram illustrating an application example (1) of the positioning request method according to the present embodiment.

FIG. 5 illustrates application example (1) of the positioning request method according to the present embodiment. Processing illustrated in FIG. 5 corresponds to the basic sequence illustrated in FIG. 4, and is executed by the wireless terminal station 101, the N wireless base stations 102, the control server 103, and the reception server 104 of the wireless communication system 100 described in FIG. 2.

In the present application example (1), the reception server 104 is a web server installed by the operator or the like who provides a service based on the position of the wireless terminal station 101 to the owner of the wireless terminal station 101. Here, the owner of the wireless terminal station 101 can access the reception server 104 using a web browser of an application installed as a standard in the wireless terminal station 101. The web browser is installed as a standard in the wireless terminal station 101 such as an ordinary smartphone and need not be additionally installed.

In the present application example (1), a case in which an operator or the like sells food such as beer to the owner of the wireless terminal station 101 who is watching sports at a stadium will be described.

In FIG. 5, the wireless terminal station 101 belongs to the wireless base station 102 and can access the reception server 104. Further, information such as the identification information or a belonging relationship of the wireless terminal station 101 and the wireless base station 102 is held in the control server 103 (S101). When the owner of the wireless terminal station 101 wants food such as beer while watching sports in a seat of a stadium, the owner goes to a store in the stadium to purchase the food or needs to wait for a seller to come near a seat of the owner to sell food in the related art. However, in the present embodiment, the owner accesses a web server (corresponding to the reception server 104) of the stadium using a browser of the wireless terminal station 101 such as a smartphone, selects a desired object on a sales menu of food displayed on a web browser screen, and taps a service request button. In an example of the web browser screen illustrated in FIG. 5, the menu of food that can be sold at the stadium is displayed, food to be purchased are tapped and selected (beer in FIG. 5), and the request button is tapped. Accordingly, a service provision request (beer delivery) including the identification information of the wireless terminal station 101 is transmitted to the reception server 104 (S102). When the owner taps the request button to confirm the reception, a message "The staff will arrive quickly. Please wait for a while." may be displayed on the screen. The processes from steps S103 to S108 are performed in the same manner as in FIG. 4, and the position information of the wireless terminal station 101 is transmitted from the control server 103 to the reception server 104 as a result of positioning (S108). A person in charge of food of an operator who operates the reception server 104 performs a service for delivering ordered food or the like to the owner of the wireless terminal station 101 on the basis of the position information of the wireless terminal station 101 that has made the service provision request (S109). The position information of the owner who has made the service provision request to, for example, a smartphone of the person in charge of food and information on food to be delivered may be transmitted from the reception server 104. Further, when necessary, price of food to be purchased can be charged to the owner in addition to a charge of the smartphone, or can be settled by electronic money of another operator.

Here, when the request button is tapped on the web browser screen, a seat number of the owner who holds the wireless terminal station 101 may be displayed. Accordingly, the owner can confirm the service provision request. Similarly, the reception server 104 may specify the seat number of the owner who has made the service provision request on the basis of the position information received from the control server 103. Further, in the case of the positioning request method according to the present embodiment, the owner can make a service provision request even when the owner is on a standing seat.

Thus, when the owner of the wireless terminal station 101 wants food such as a beer while watching sports at a stadium or the like, the owner can have the food delivered simply by accessing a web server in the stadium using a browser of the wireless terminal station 101 such as a smartphone and tapping a service provision request button. In particular, in the present application example (1), the owner of the wireless terminal station 101 can agree to the positioning by tapping the service provision request button, and a privacy problem does not occur.

Application Example (2)

Figure 6:
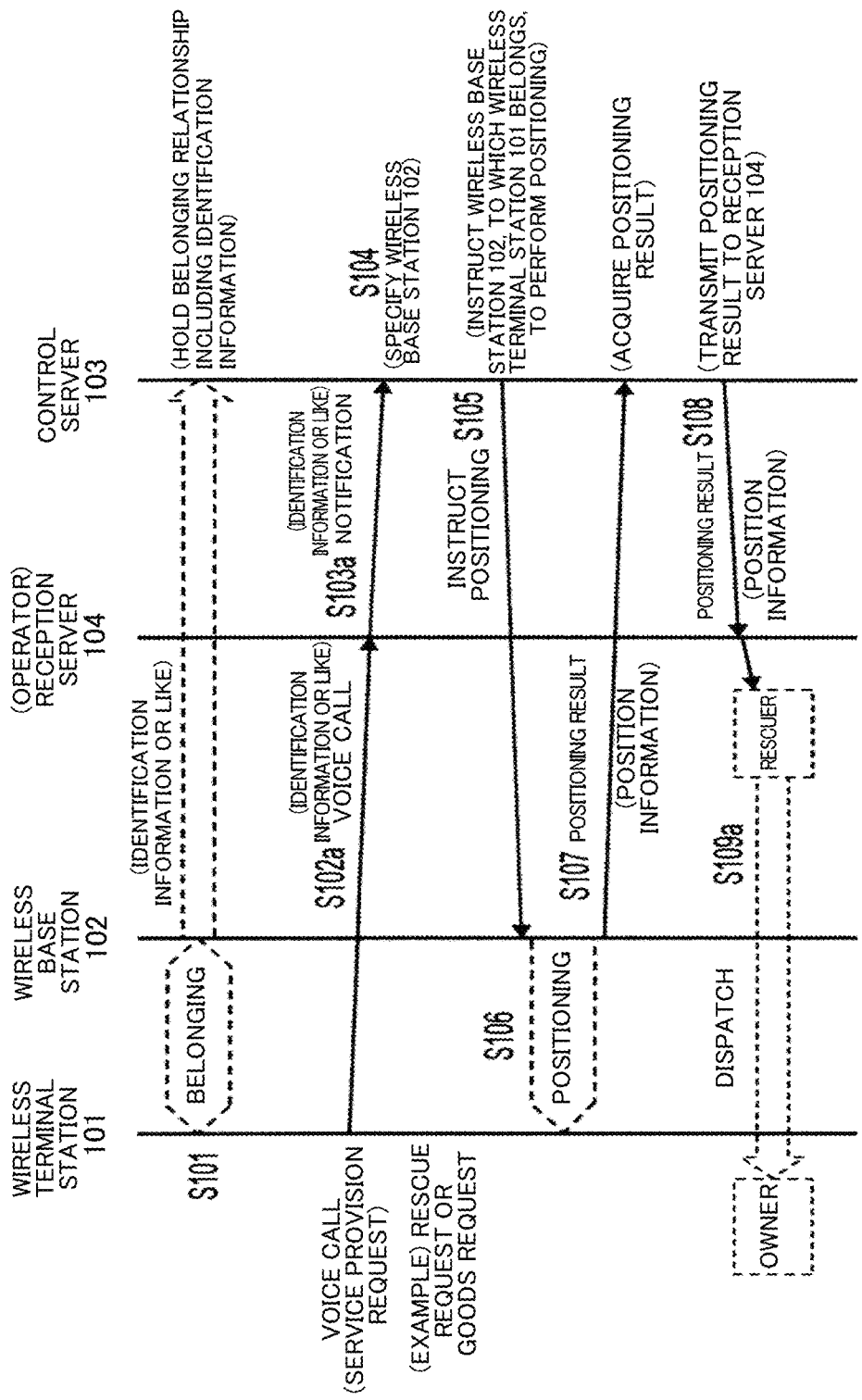
FIG. 6 is a diagram illustrating an application example (2) of the positioning request method according to the present embodiment.

FIG. 6 illustrates application example (2) of the positioning request method according to the present embodiment. Processing illustrated in FIG. 6 corresponds to the basic sequence illustrated in FIG. 4, and is executed by the wireless terminal station 101, the N wireless base stations 102, the control server 103, and the reception server 104 of the wireless communication system 100 described in FIG. 2.

In the present application example (2), the reception server 104 is a server installed by the operator or the like who provides a service based on the position of the wireless terminal station 101 to the owner of the wireless terminal station 101, and takes an action through a voice call. Here, the owner of the wireless terminal station 101 connects to the reception server 104 through a voice call of the wireless terminal station 101. The wireless terminal station 101 such as an ordinary smartphone can make a telephone call through a voice call, and no new hardware or application is necessary.

In the present application example (2), a case in which the owner of the wireless terminal station 101 makes a service provision request such as a rescue request or delivery of a product as described in application example (1) through a voice call will be described.

In FIG. 6, the wireless terminal station 101 belongs to the wireless base station 102 and can access the reception server 104. Further, the information such as the identification information or a belonging relationship of the wireless terminal station 101 and the wireless base station 102 is held in the control server 103 (S101). A state up to this point is the same as in the case of application example (1).

In FIG. 6, the owner of the wireless terminal station 101 makes a rescue request through a telephone call (voice call) to a rescue destination (medical-related or security-related organization, or the like) due to poor physical condition or distress while away from home. Accordingly, a telephone call including the identification information is received by the reception server 104 (S102a). Content of the rescue request of the owner is confirmed by the operator who operates the reception server 104 or an automatic voice response. Here, When the operator takes an action through a voice call, the reception server 104 notifies the control server 103 of the positioning request including the identification information (telephone number, or the like) of the wireless terminal station 101 on the basis of the content of the rescue request (S103a). Alternatively, when the reception server 104 responds through an automatic voice response, the reception server 104 confirms the content of the rescue request through a numeric keypad operation of a telephone, voice recognition, or the like, and notifies the control server 103 of the positioning request including the identification information of the wireless terminal station 101 (S103a). The processes from steps S104 to S108 are performed in the same manner as in FIG. 4 or 5, and the position information of the wireless terminal station 101 is transmitted from the control server 103 to the reception server 104 as a result of positioning (S108). A rescue organization that manages the reception server 104 dispatches a rescuer to a place at which there is the owner of the wireless terminal station 101 on the basis of the position information of the wireless terminal station 101 of the owner who has made the rescue request (S109a). The reception server 104 may display a message "Rescue is requested at a place X. Make haste." on a monitor screen so that the operator can confirm the message, and transmit the message to a wireless terminal such as a smartphone owned by the rescuer.

Thus, the owner of the wireless terminal station 101 can make the service provision request such as the rescue request to the reception server 104 through a voice call such as a telephone call to request dispatch of the rescuer. In particular, it is possible to agree to the positioning using a request such as a rescue request through a voice call, and there is no privacy problem.

Application Example (3)

Figure 7:
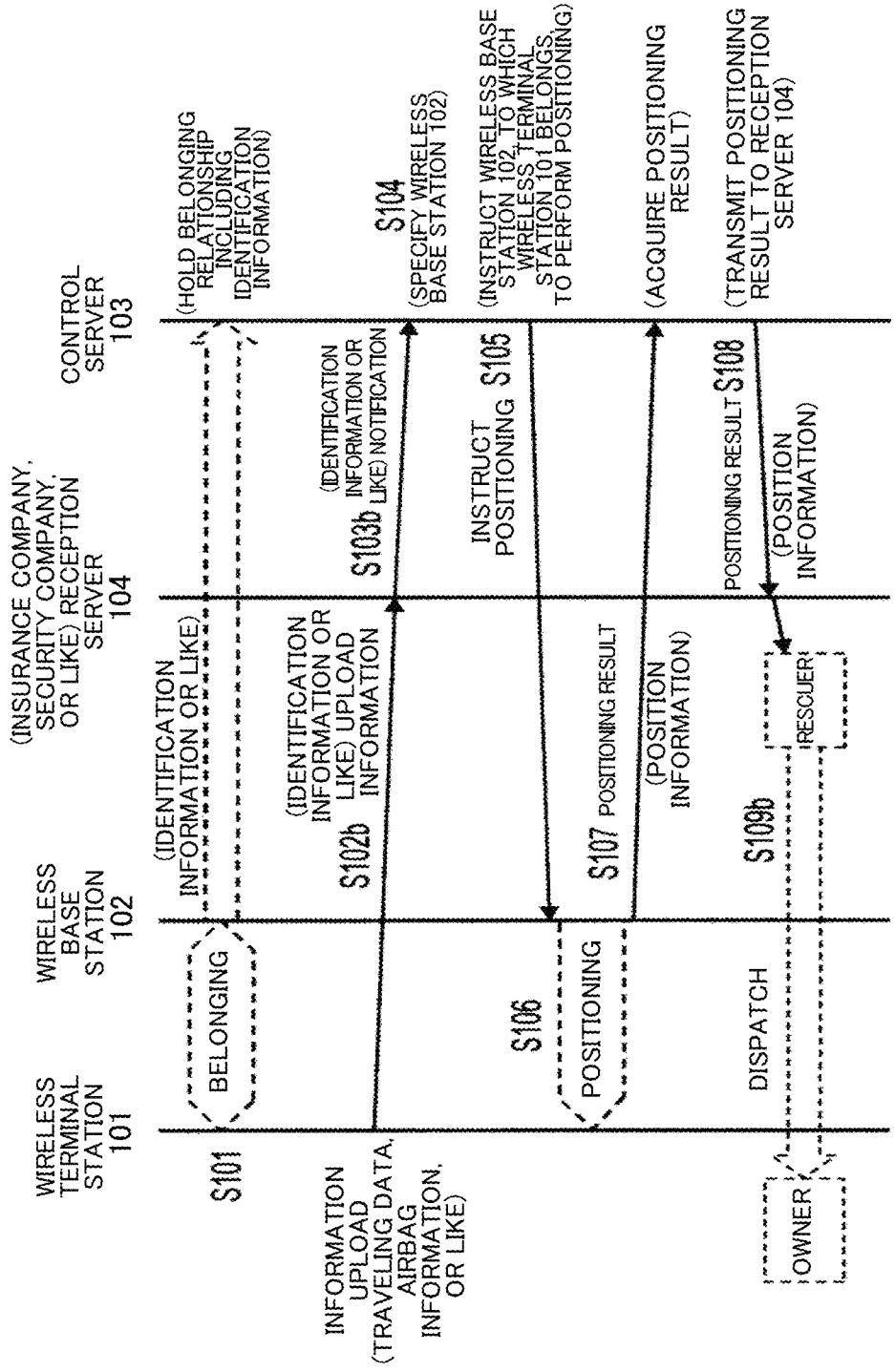
FIG. 7 is a diagram illustrating an application example (3) of the positioning request method according to the present embodiment.

FIG. 7 illustrates application example (3) of the positioning request method according to the present embodiment. Processing illustrated in FIG. 7 corresponds to the basic sequence illustrated in FIG. 4, and is executed by the wireless terminal station 101, the N wireless base stations 102, the control server 103, and the reception server 104 of the wireless communication system 100 described in FIG. 2.

In the present application example (3), the wireless terminal station 101 is mounted on a vehicle or the like and has a function of automatically uploading some information such as traveling data or airbag information to a server (for example, the reception server 104) on the side of the operator such as an insurance company or a security company. When the reception server 104 determines that an abnormality has occurred in the vehicle or an accident has occurred on the basis of the traveling data of the vehicle or information indicating an operation of the airbag that is uploaded regularly, the reception server 104 can perform positioning of the wireless terminal station 101 and dispatch a rescuer or the like to a site.

In FIG. 7, the wireless terminal station 101 mounted in the vehicle or the like belongs to the wireless base station 102 and can access the reception server 104. Further, information such as the identification information or a belonging relationship of the wireless terminal station 101 and the wireless base station 102 is held in the control server 103 (S101). A state up to this point is the same as in the case of application example (1) and application example (2).

In FIG. 7, the wireless terminal station 101 is, for example, an in-vehicle terminal of a vehicle, and regularly uploads traveling data or operation information of an airbag to the reception server 104 (S102b). The reception server 104 discriminates whether or not information that can be regarded as indicating a dangerous operation such as sudden braking, sudden steering, and sudden accelerating or the operation information of the airbag is included in the traveling data that is regularly uploaded from the wireless terminal station 101. When such information is included, the reception server 104 determines the dangerous operation to be an abnormality and notifies the control server 103 of the positioning request including the identification information of the wireless terminal station 101 (S103b). The processes from steps S104 to S108 are performed in the same manner as in FIGS. 4, 5 and 6, and the position information of the wireless terminal station 101 is transmitted from the control server 103 to the reception server 104 as a result of positioning (S108). The insurance company or the security company that manages the reception server 104 dispatches a rescuer to a place at which the vehicle having the wireless terminal station 101 mounted therein is located, on the basis of the position information of the wireless terminal station 101 (S109b).

Thus, the reception server 104 can discriminate whether or not it is necessary for a rescuer to be dispatched on the basis of the traveling data, the operation information of the airbag, and the like of the vehicle having the wireless terminal station 101 mounted therein, and dispatch the rescuer. In particular, when the information that can be regarded as indicating a dangerous operation such as sudden braking, sudden steering, and sudden accelerating or the operation information of the airbag is included in the traveling data that is regularly uploaded from the wireless terminal station 101, the rescue request is received on the basis of this determination and the positioning is regarded as having been agreed by a requester, such that it is possible to automatically make the rescue request and perform agreement on privacy.

Application Example (4)

Figure 8:
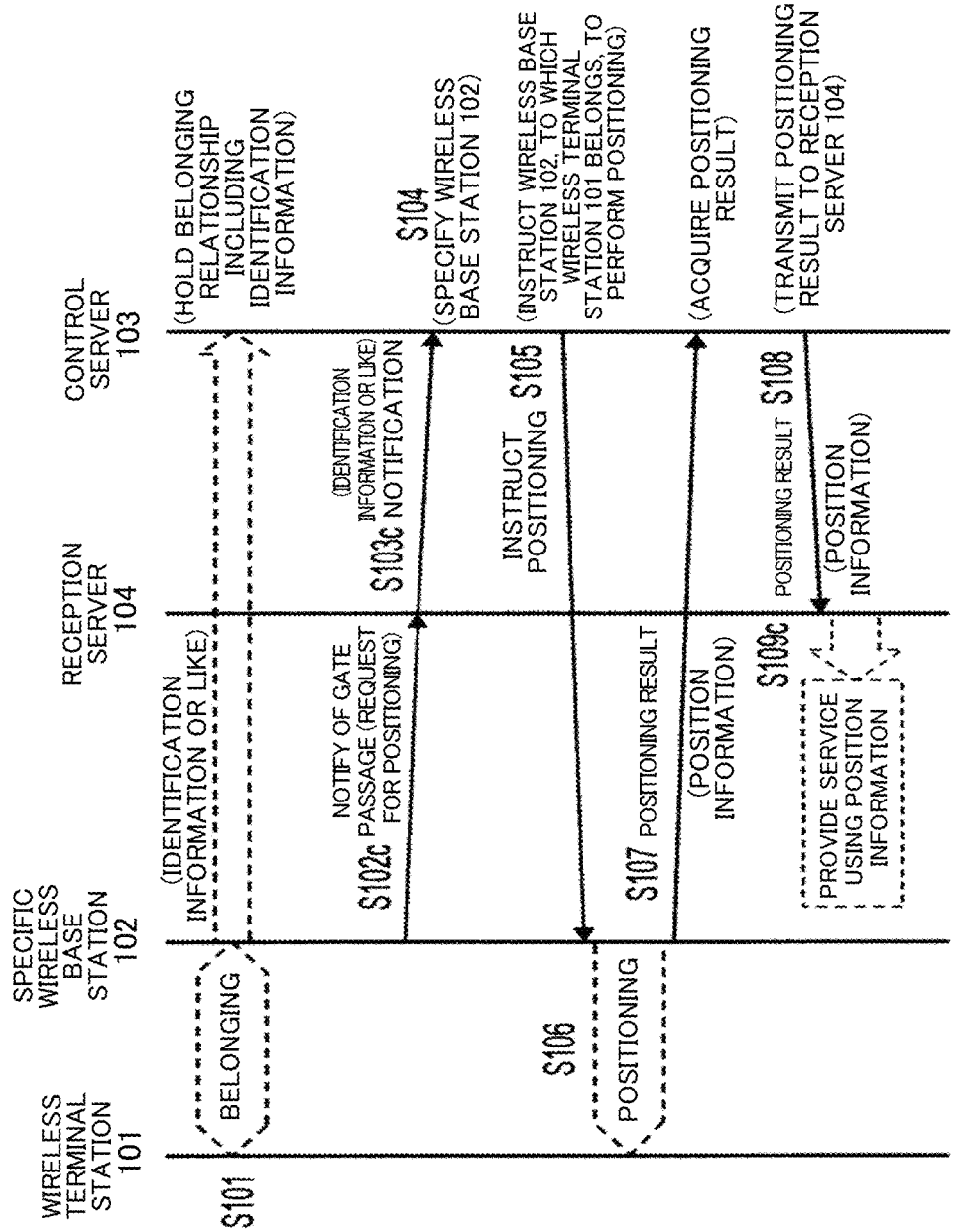
FIG. 8 is a diagram illustrating an application example (4) of the positioning request method according to the present embodiment.

FIG. 8 illustrates application example (4) of the positioning request method according to the present embodiment. Processing illustrated in FIG. 8 corresponds to the basic sequence illustrated in FIG. 4, and is executed by the wireless terminal station 101, the N wireless base stations 102, the control server 103, and the reception server 104 of the wireless communication system 100 described in FIG. 2.

In the present application example (4), a case in which a predetermined specific wireless base station 102 functions as a gate that detects the wireless terminal station 101, the wireless terminal station 101 belongs to the specific wireless base station 102 when the wireless terminal station 101 passes through the gate, belonging of the wireless terminal station 101 to the wireless base station 102 is regarded as the service provision request (request for positioning) from the wireless terminal station 101, and the reception server 104 is notified of the service provision request will be described. Here, the gate is provided, for example, at an entrance of a theme park or an event venue by an operator or the like, and can provides services such as guidance according to position information to the owner of the wireless terminal station 101 who has entered through the gate.

In FIG. 8, the wireless terminal station 101 belongs to the wireless base station 102 and can access the reception server 104. Further, the information such as the identification information or a belonging relationship of the wireless terminal station 101 and the wireless base station 102 is held in the control server 103 (S101).

When the wireless terminal station 101 belongs to the specific wireless base station 102 serving as the gate, the wireless base station 102 transmits a gate passage notification including the identification information of the wireless terminal station 101 to the reception server 104 (S102c). The reception server 104 determines that the wireless terminal station 101 has agreed to the positioning on the basis of the notification of the gate passage of the wireless terminal station 101 (belonging to the specific wireless base station 102), and notifies the control server 103 of the positioning request including the identification information of the wireless terminal station 101 (S103c). The processes from steps S104 to S108 are performed in the same manner as in FIGS. 4, 5, 6, and 7, and the position information of the wireless terminal station 101 is transmitted from the control server 103 to the reception server 104 as a result of positioning (S108). The operator or the like who manages the reception server 104 provides a service using the position information of the wireless terminal station 101 (S109b). When the positioning is regarded as having been agreed through the passage through the gate, agreement regarding privacy to provide the position information to the owner of the wireless terminal station 101 can be obtained using a method in which a signboard stating that position information is acquired is installed near the gate or at an entrance to a specific area, a staff member explains that position information of the wireless terminal station 101 is acquired in a specific area, or the like. The owner of the wireless terminal station 101 who does not agree to the positioning avoids the passage of the gate, making it possible to protect privacy.

Thus, the specific wireless base station 102 can be caused to function as the gate, and automatically provide a service according to the position information to the owner of the wireless terminal station 101 that has passed through the gate. In particular, the positioning is automatically regarded as having been agreed through the passage through the gate, making it possible to solve a privacy problem.

In application example (4), even when change from the wireless base station 102 to which the wireless terminal station 101 belongs to another wireless base station 102 occurs after the wireless terminal station 101 passes through the gate, the other wireless base station 102 may continue the positioning of the wireless terminal station 101 for a predetermined period of time.

Further, when the owner of the wireless terminal station 101 stops by a predetermined area such as a specific room like passage through the gate, the wireless terminal station 101 may belong to the specific wireless base station 102, and it may be automatically considered that the owner agrees to positioning on the basis of the belonging.

Further, when a time is divided and the owner of the wireless terminal station 101 stops by a predetermined area (for example, a restaurant area) at a predetermined fixed time (for example, at lunch time from 12:00 to 13:00), the wireless terminal station 101 is caused to belong to the specific wireless base station 102, and it may be automatically considered that the owner agrees to positioning on the basis of the belonging.

Modification Example of Application Example (1)

Figure 9:
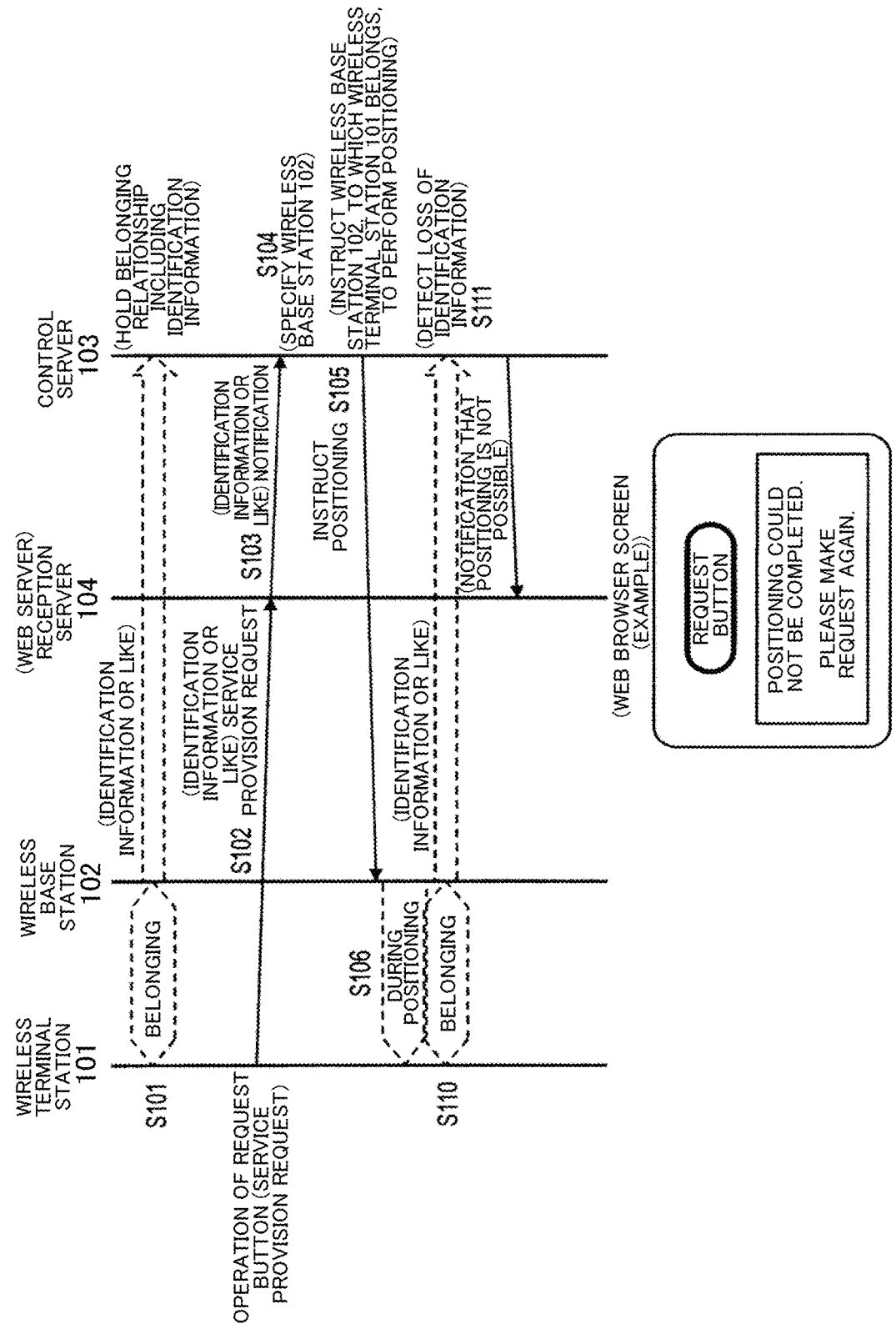
FIG. 9 is a diagram illustrating a modification example of application example (1).

FIG. 9 illustrates a modification example of application example (1) described with reference to FIG. 5. In the present modification example, a case in which the wireless terminal station 101 has a function of regularly changing the identification information for protection of privacy will be described. For example, the wireless terminal station 101 randomly generates a MAC address and regularly changes the MAC address to perform anonymization. Therefore, for example, in application example (1) of FIG. 5, when the identification information of the wireless terminal station 101 is changed before the wireless base station 102 ends the positioning the wireless terminal station 101, the wireless base station 102 cannot complete the positioning of the wireless terminal station 101.

In FIG. 9, the processes from steps S101 to S106 are the same as in FIG. 5. The identification information of the wireless terminal station 101 is changed while the wireless base station 102 is performing positioning of the wireless terminal station 101 in step S106. In this case, the wireless base station 102 detects the wireless terminal station 101 of which the identification information has been changed as a wireless terminal station 101 newly belonging to the wireless base station 102, notifies the control server 103 of, for example, the identification information of the wireless terminal station 101 newly belonging to the wireless base station 102, and determines that the wireless terminal station 101 having the identification information before the change does not belong to the wireless base station 102, and notifies the control server 103 of a loss of the identification information (S110). The control server 103 receives the notification in step S110 and holds the identification information of the wireless terminal station 101 newly belonging to the wireless base station 102. At the same time, the control server 103 detects the loss of the identification information of the wireless terminal station 101 that has been given the positioning instruction in step S105, deletes belonging of the wireless terminal station 101 having the identification information, and notifies the reception server 104 that the positioning is not possible (S111). The reception server 104 can display, for example, "Positioning could not be completed. Please make a request again." on the web browser screen of the wireless terminal station 101 and notify the owner of the wireless terminal station 101 of the fact. Here, when the owner taps the request button on the web browser screen again, the processes of steps S102 to S109 described in FIG. 5 are executed again, and the owner can receive the food delivered from the person in charge of food.

Thus, when the identification information of the wireless terminal station 101 is changed before the positioning is completed, the reception server 104 displays a message indicating that the positioning could not be completed on the web browser screen, and requests the owner to tap the request button again so that the service provision request is continued. Similarly, even when the identification information is changed due to release of belonging of the wireless terminal station 101 or re-belonging before the service provision request is completed, the same processing as in the above example can be performed.

Here, in the modification example of FIG. 9, when the identification information of the wireless terminal station 101 is changed during the positioning of the wireless terminal station 101, positioning is not possible, but the control server 103 may detect change in the identification information of the wireless terminal station 101 and the wireless base station 102 may perform positioning using the changed identification information.

Figure 10:
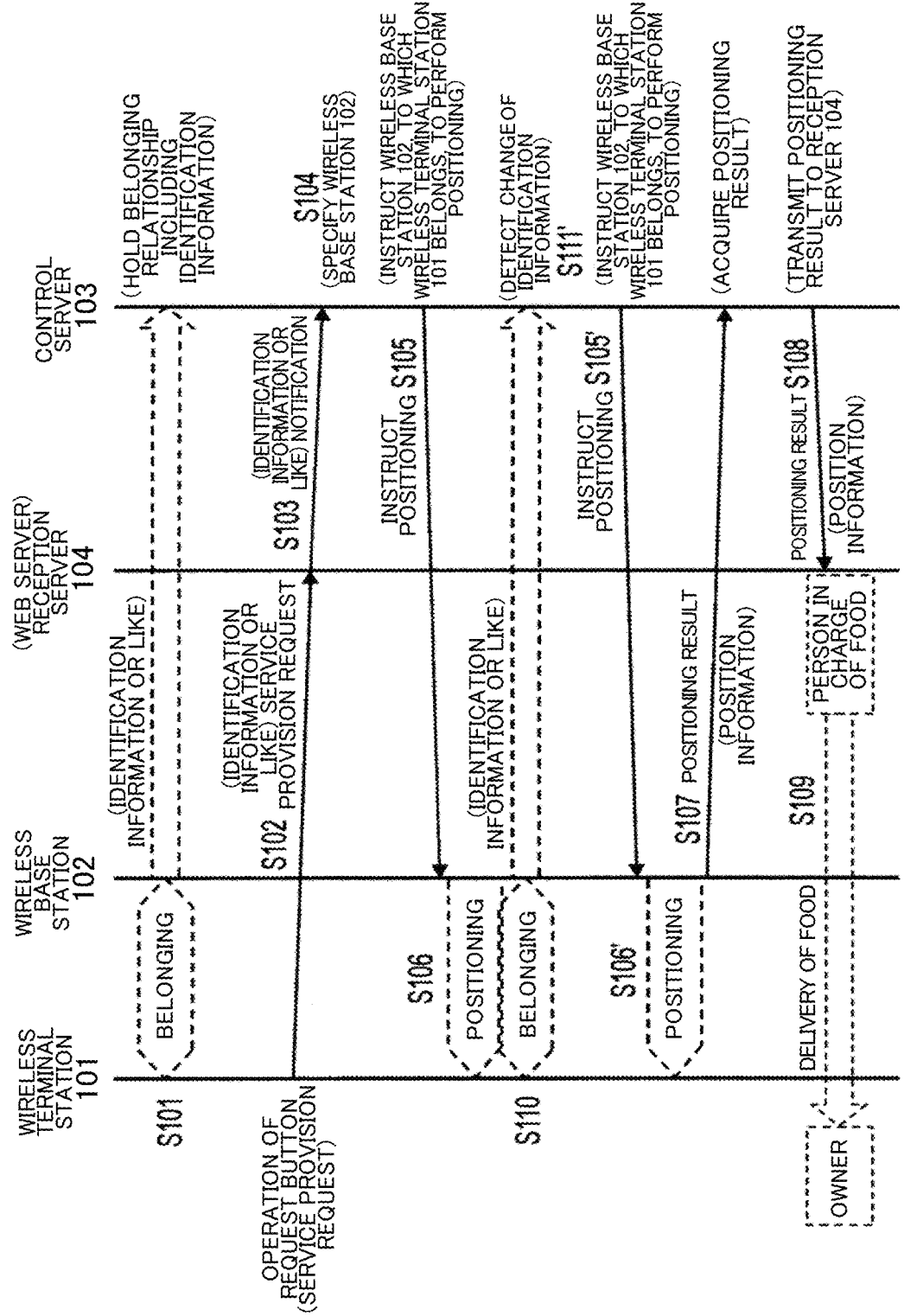
FIG. 10 is a diagram illustrating an example of a processing procedure in a case in which a positioning instruction is given to a wireless base station using identification information after change.

FIG. 10 illustrates an example of a processing procedure in a case in which a positioning instruction is given to the wireless base station 102 using the changed identification information. In FIG. 10, the control server 103 detects the change in the identification information of the wireless terminal station 101, and instructs the wireless base station 102 to perform positioning using the changed identification information. In FIG. 10, processes of steps S101 to S110 are the same as those in FIG. 9. The control server 103 receives the notification in step S110 and holds the identification information of the wireless terminal station 101 newly belonging to the wireless base station 102. At the same time, the control server 103 detects a loss of the identification information of the wireless terminal station 101 that has been given the positioning instruction in step S105, and deletes belonging of the wireless terminal station 101 having the identification information. However, when the control server 103 can detect that the wireless terminal station 101 of which the identification information has been lost and the wireless terminal station 101 newly belonging to the wireless base station 102 are the same terminal, the control server 103 determines that the wireless terminal station 101 has changed the identification information (step S111'), unlike in FIG. 9. For example, it is possible to detect that the terminals are the same on the basis of individual information of the wireless terminal station 101, a timing of change, and the like. The control server 103 transmits the instruction of positioning of the wireless terminal station 101 having the new identification information to the wireless base station 102 (S105').

The wireless base station 102 that has received the instruction of positioning of the wireless terminal station 101 having the new identification information from the control server 103 performs positioning of the wireless terminal station 101 (S106'). Thereafter, the processes of steps S107 to S108 are performed in the same manner as in the example of FIG. 5, and the owner of the wireless terminal station 101 can receive the food delivered from the person in charge of food (S109).

Thus, even when the wireless terminal station 101 has a function of regularly changing the identification information for protection of privacy, the owner of the wireless terminal station 101 can agree to the positioning through an act of making a service provision request to the reception server 104, and receive the service.

When the owner of the wireless terminal station 101 who has made the service provision request cancels the service provision request, the reception server 104 may notify the control server 103 that the positioning of the wireless terminal station 101 is stopped and discard the identification information for specifying the wireless terminal station 101 and the positioning result that has already been obtained. Further, even when the service provision request is completed, the identification information for specifying the wireless terminal station 101 or the positioning result is discarded.

[Positioning Request Method]

Figure 11:
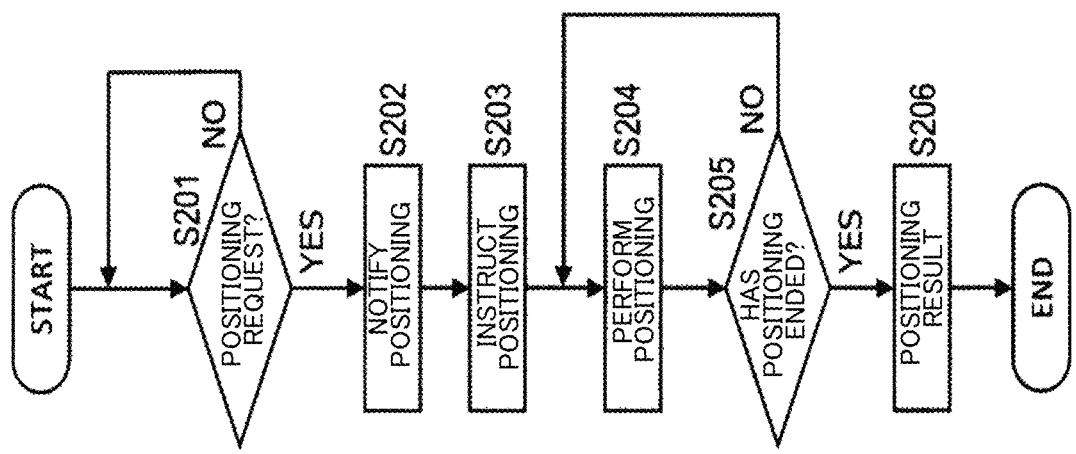
FIG. 11 is a diagram illustrating an example of a processing procedure of a positioning request method in which a wireless terminal station having no positioning means performs positioning.

FIG. 11 illustrates an example of a processing procedure of a positioning request method in which the wireless terminal station 101 having no positioning means performs positioning. Processing illustrated in FIG. 11 is common to the respective application examples described above.

In step S201, the reception server 104 receives the positioning request from the wireless terminal station 101, and proceeds to a process of step S202 when there is the positioning request. Here, the positioning request is included in a service provision request and when the service provision request has been made, a determination is made that the positioning request has been made.

In step S202, the reception server 104 notifies the control server 103 of the identification information and the positioning of the wireless terminal station 101 that has made the service provision request.

In step S203, the control server 103 specifies the wireless base station 102 to which the wireless terminal station 101 belongs on the basis of the identification information of the wireless terminal station 101 notified of by the reception server 104, and instructs the specified wireless base station 102 to perform positioning while indicating the identification information of the wireless terminal station 101.

In step S204, the wireless base station 102 that has received the positioning instruction from the control server 103 performs the positioning of the wireless terminal station 101 having the indicated identification information. For example, the wireless base station 102 having distributed antennas performs the positioning of the wireless terminal station 101 using the method described in NPL 2.

In step S205, the wireless base station 102 continues the process of step S204 until the positioning of the wireless terminal station 101 ends. When the positioning ends, the process of step S206 is executed.

In step S206, the wireless base station 102 transmits a result of the positioning of the wireless terminal station 101 to the control server 103. The control server 103 transmits the result (position information) of the positioning of the wireless terminal station 101 received from the wireless base station 102 to the reception server 104.

Thus, the reception server 104 that has received the service provision request from the wireless terminal station 101 can acquire the position information of the wireless terminal station 101 and provide the service using the position information.

The reception server 104 can obtain the identification information of the wireless terminal station 101 at a point in time when the owner of the wireless terminal station 101 taps the request button, and immediately performs positioning of the wireless terminal station 101 using the control server 103 and the wireless base station 102 to which the wireless terminal station 101 belongs. Accordingly, the reception server 104 can specify the wireless terminal station 101 and perform positioning even when the identification information is anonymized or is temporary random identification information. However, the identification information of the wireless terminal station 101 may be changed while the positioning of the wireless terminal station 101 is being performed by the wireless base station 102, as will be described next.

Figure 12:
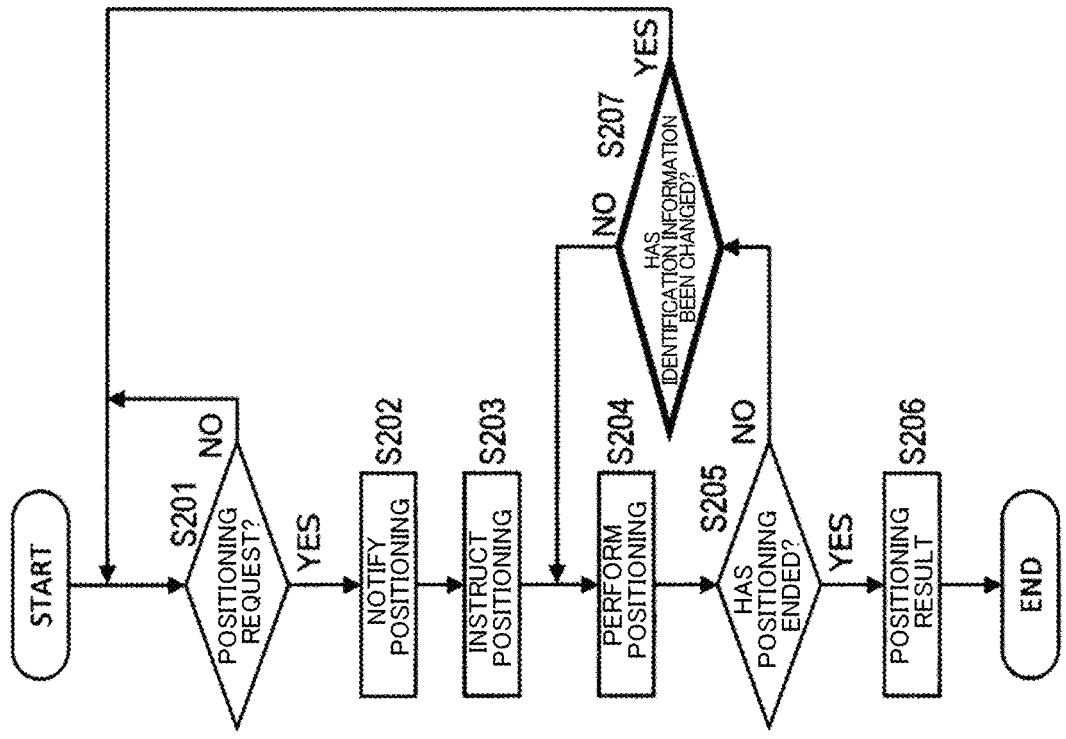
FIG. 12 is a diagram illustrating an example of a processing procedure in a case in which identification information of a wireless terminal station is changed during positioning.

FIG. 12 illustrates an example of a processing procedure in a case in which the identification information of the wireless terminal station 101 is changed during positioning. In the processing illustrated in FIG. 12, when the identification information of the wireless terminal station 101 is changed due to release of belonging of the wireless terminal station 101 to the wireless base station 102 or re-belonging during the positioning in steps S204 and S205, the process of step S207 is executed.

In step S207, the wireless base station 102 that has received the positioning instruction from the control server 103 determines whether or not the identification information of the wireless terminal station 101 having the indicated identification information has been changed. When the identification information has been changed, the processing returns to step S201, and the reception server 104 waits until the positioning request is received from the wireless terminal station 101 again. In this case, the reception server 104 may notify the owner of the wireless terminal station 101 that the positioning has not been completed. Here, the wireless base station 102 may determine whether or not belonging of the wireless terminal station 101 has been released, and return to the process of step S201 when the belonging is released.

Thus, the reception server 104 can perform positioning of the wireless terminal station 101 even when the identification information of the wireless terminal station 101 has been changed.

Figure 13:
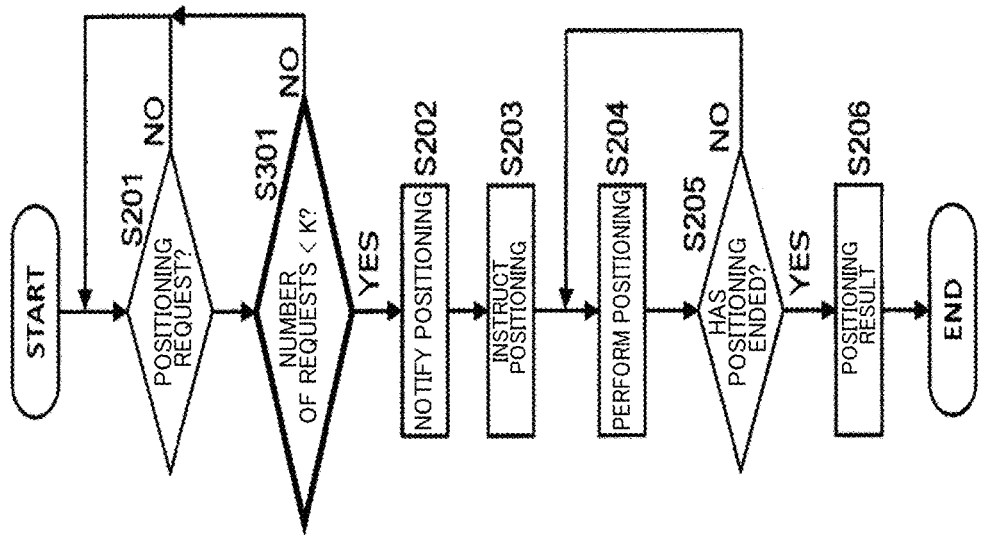
FIG. 13 is a diagram illustrating an example of limiting a positioning process on the basis of the number of requests.

FIG. 13 illustrates an example of limiting a positioning process on the basis of the number of requests. In FIG. 13, processes having the same step number as in FIG. 11 are the same as in FIG. 11.

In step S301, when the reception server 104 receives the positioning request from the wireless terminal station 101 in step S201, the reception server 104 determines whether the number of requests received from the wireless terminal station 101 having the same identification information is smaller than a predetermined number of times K (K is a positive integer). When the number of requests is smaller than K, the processing proceeds to step S202, and when the number of requests is equal to or larger than K, the processing returns to step S201. Processes of step S202 and subsequent steps are the same as those in the example of FIG. 11.

Thus, because it is assumed that the owner of the wireless terminal station 101 has not moved from one place to another when the reception server 104 receives a plurality of requests from the same wireless terminal station 101, the server side can omit the positioning of the wireless terminal station 101 after the second time and use the result of the previous positioning, for example. In this case, the server side may perform positioning of the wireless terminal station 101 only for several predetermined initial times (for example, three times), and omit subsequent positioning when positioning results are the same.

Figure 14:
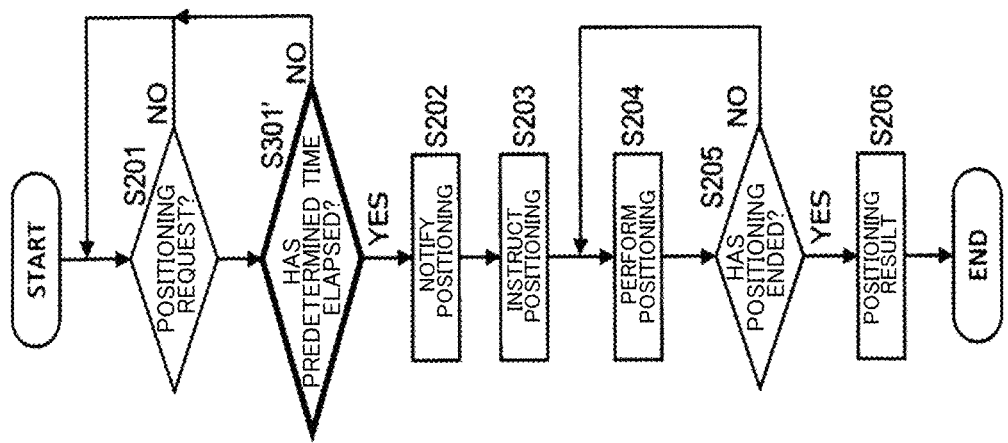
FIG. 14 is a diagram illustrating an example of limiting a positioning process on the basis of a predetermined time.

FIG. 14 illustrates an example of limiting the positioning process on the basis of a predetermined time. In FIG. 14, processing having the same step numbers as in FIG. 11 are the same as those in FIG. 11.

In step S301', when the reception server 104 receives the positioning request from the wireless terminal station 101 in step S201, the reception server 104 determines whether or not a predetermined time has elapsed since the reception server has received the first request from the wireless terminal station 101 having the same identification information. When the predetermined time has elapsed since the reception server has received the first request, the processing proceeds to step S202, and when the predetermined time has not elapsed, the processing returns to step S201. Processing after step S202 is the same as that in the example of FIG. 11.

Thus, since it is assumed that the owner of the wireless terminal station 101 has not moved from one place to another place when the reception server 104 receives the plurality of requests from the same wireless terminal station 101 within the predetermined time, the server side can omit the plurality of positioning requests within the predetermined time.

Thus, in the processing described with reference to FIGS. 13 and 14, because a plurality of same requests from the wireless terminal station 101 that has not moved its position can be omitted and the wireless base station 102 does not perform unnecessary positioning, it is possible to reduce a load on the control server 103, the wireless base station 102, or the wireless terminal station 101.

Similarly, when the traffic in the radio section between the wireless terminal station 101 and the wireless base station 102 is congested, the control server 103 may postpone the positioning instruction to the wireless base station 102 or the wireless base station 102 itself that has received the positioning instruction may postpone the positioning, and perform the positioning when the traffic is not congested. Accordingly, it is possible to prevent a positioning frame transmitted or received between the wireless terminal station 101 and the wireless base station 102 from oppressing the communication in the radio section.

Other Application Examples (1) The reception server 104 may regularly continue positioning of the wireless terminal station 101 even after receiving a request for positioning of the wireless terminal station 101. Accordingly, even when the owner of the wireless terminal station 101 is always moving at a place such as a hall, the reception server 104 can track a position of the owner of the wireless terminal station 101 and easily find out a place at which the owner is located.

(2) The owner of the wireless terminal station 101 makes the positioning request to the reception server 104 and then leaves the place such that the operator or the like can be anonymously notified of only information on a position at which some action is required. For example, an example in which a railway company or the like provides a service for anonymously notifying of troubles at a station or the like may be considered. In this case, the owner of the wireless terminal station 101 who has found the trouble simply connects to a web server (the reception server 104) of the railway company using the web browser and taps a trouble report button (or a request button), so that the reception server 104 is notified of the identification information of the wireless terminal station 101 and the occurrence of trouble. The reception server 104 that has received the notification can perform the positioning of the wireless terminal station 101 that has performed the notification, specify a place in which the trouble is occurring, and dispatch a security guard or the like according to a flow of the processing described in FIG. 11. The owner of the wireless terminal station 101 can protect privacy by leaving the place. Here, it is assumed that a time required for positioning the wireless terminal station 101 is sufficiently shorter than a time required for the owner who has made the notification to leave the place and for the belonging to the wireless base station 102 to be released.

(3) It is also possible to present information or services for the owner of the wireless terminal station 101 when the owner of the wireless terminal station 101 approaches a specific place such as a signage, a vending machine, a store, or the like installed by the operator side, instead of the operator side finding the owner. In this case, the wireless base station 102 having a short communication distance is installed in a signage, a vending machine, a store, or the like, and the reception server 104 obtains the position information of the wireless terminal station 101 using the belonging to the wireless base station 102, so that positioning by the wireless base station 102 is unnecessary.

(4) Only an operation of knowing a rough position necessary for provision of a communication service may be performed in a normal case, and positioning may be performed with fine accuracy only when the owner of the wireless terminal station 101 determines that positioning is necessary. This can minimize battery consumption of the wireless terminal station 101 or an increase in traffic in the radio section due to the transmission or reception of a positioning signal between the wireless terminal station 101 and the wireless base station 102. Further, since positioning of the wireless terminal station 101 is performed only when necessary, it is difficult for a privacy problem to occur.

(5) Even when the wireless terminal station 101 that automatically uploads some information (such as information when an airbag of a vehicle is operating) does not have a positioning function or a function of uploading a positioning result, particularly, it is not necessary to add these functions to the wireless terminal station 101, and when the server side detects an abnormality from the uploaded information, the server side automatically regards a service provision request as having been made and performs positioning of the wireless terminal station 101, making it possible for the operator to respond quickly in emergency.

[Effects]

As described in each embodiment, the positioning request method and the positioning request device according to the present invention can be used indoors or outdoors as long as an infrastructure based on the wireless communication system 100 is provided. In particular, when the wireless terminal station 101 is a terminal such as a general smartphone, the owner of the wireless terminal station 101 can request the operator or the like to provide a service such as a rescue request and delivery of goods without including hardware for positioning such as GNSS or installing a dedicated application. The operator or the like who has received the request can acquire position information of a requester substantially at the same time as the request.

Accordingly, the operator or the like who has received the request can obtain a permission from the owner and then perform the positioning of the wireless terminal station 101 held by the owner. In particular, since the present invention can be used even in an environment in which the GNSS cannot be used, such as indoors, and it is not necessary to install a dedicated application in advance, it is possible for the owner of the wireless terminal station 101 to quickly make a service provision request to the operator side, when necessary. Further, because the operator or the like who has received the service provision request also obtains agreement of the owner for privacy information through the request and can acquire the position information of the owner of the wireless terminal station 101 substantially at the same time as the request, it is not necessary to find the owner and a quick response is possible.

Further, because the positioning of the wireless terminal station 101 is performed by the wireless base station 102 to which the wireless terminal station 101 belongs at a point in time when the service provision request is made by the wireless terminal station 101, it is possible to specify the wireless terminal station 101 that has made the service provision request and acquire the position of the wireless terminal station 101 even when the wireless terminal station 101 uses anonymization or temporary identification information.

In particular, it is possible to obtain a specific agreement of the owner regarding the positioning and solve a privacy problem through an act of causing the owner of the wireless terminal station 101 to tap the request button or a reply such as voice guidance.

Thus, the positioning request method and the positioning request device according to the present invention can adapt to, for example, a system that makes not only a rescue request in emergency, but also a request for provision of food or the like when there are a large number of people in a wide area such as spectators' seats in a stadium. Further, because the positioning of the wireless terminal station 101 can be performed only when necessary, it is possible to curb an increase in battery consumption of the wireless terminal station 101, an increase in traffic in the radio section, and occurrence of a privacy problem.

As described above in each embodiment, with the positioning request method and the positioning request device according to the embodiment, it is possible to use various services using the position information while solving a privacy problem even in the wireless terminal station 101 in which a GNSS or a dedicated application is not installed. Further, it is possible to achieve a small size or low cost of the wireless terminal station 101 by not installing the GNSS or the like.

The positioning request device and the positioning request method that are mainly performed by the control server 103 and the reception server 104 described in each embodiment can be realized by a computer and a program, and the program can be recorded on a recording medium or can be provided through a network.

REFERENCE SIGNS LIST

100 Wireless communication system
101, 701 Wireless terminal station
102 Wireless base station
103 Control server
104 Reception server
105 Network
201, 301 Signal transmission unit 202, 302 Signal reception unit
203, 304 Antenna
204, 402, 502 Control unit
205 Operation unit
206 Display unit
303 Antenna switching unit
305 Position measurement unit
306, 401, 501 Communication unit
403 Database

The invention claimed is:

1. A positioning request method for requesting positioning of a wireless terminal station device with the wireless terminal station device, a plurality of wireless base station devices, and a positioning request device,
wherein the wireless terminal station device makes a positioning request including identification information of its own device to the positioning request device via the wireless base station device to which the wireless terminal station device belongs among the plurality of wireless base station devices,
the positioning request device receives the positioning request from the wireless terminal station device, specifies the wireless base station device to which the wireless terminal station device belongs on the basis of the identification information of the wireless terminal station device by tracking conversion content through tracing of converting network devices in order, transmits a positioning instruction and the identification information of the wireless terminal station device to the specified wireless base station device, and receives a result of the positioning of the wireless terminal station device from the wireless base station device, and
the wireless base station device receives the instruction of positioning of the wireless terminal station device and the identification information of the wireless terminal station device from the positioning request device, performs positioning of the wireless terminal station device corresponding to the received identification information, and transmits the result of the positioning to the positioning request device.

2. The positioning request method according to claim 1, wherein the positioning request device includes
a reception server configured to receive a service provision request including positioning from the wireless terminal station device, and
a control server configured to perform a positioning instruction to the wireless base station device to which the wireless terminal station device belongs,
the reception server notifies the control server of the identification information of the wireless terminal station device from which the service provision request has been received and the positioning request and acquires a result of positioning of the wireless terminal station device for providing the service based on the position information to an owner of the wireless terminal station device from the control server, and
the control server specifies the wireless base station device to which the wireless terminal station device belongs on the basis of the identification information of the wireless terminal station device that has made the positioning request notified of by the reception server, transmits the positioning instruction and the identification information of the wireless terminal station device to the specified wireless base station device, and transmits a result of the positioning received from the wireless base station device to the reception server.

3. The positioning request method according to claim 2, wherein the wireless terminal station device has a function of uploading predetermined information or information in an emergency to the reception server, and
when the reception server determines that it is necessary to provide a service based on the position information to the owner of the wireless terminal station device on the basis of the information uploaded from the wireless terminal station device, the reception server notifies the control server of the identification information of the wireless terminal station device and a request for positioning, and acquires a result of the positioning of the wireless terminal station device from the control server.

4. The positioning request method according to claim 2, wherein, when the control server detects a change in the identification information of the wireless terminal station device that has made the positioning request before the control server acquires a result of the positioning from the wireless base station device, the control server specifies the wireless base station device to which the wireless terminal station device belongs again on the basis of the identification information after the change, transmits a positioning instruction including the identification information after the change of the wireless terminal station device to the wireless base station device that has been specified again, and acquires a result of the positioning of the wireless terminal station device.

5. A positioning request device comprising:
a reception unit configured to receive a positioning request from a wireless terminal station device; and
a control unit configured to specify a wireless base station device to which the wireless terminal station device belongs on the basis of identification information of the wireless terminal station device by tracking conversion content through tracing of converting network devices in order, transmit a positioning instruction and the identification information of the wireless terminal station device to the specified wireless base station device, and receive a result of the positioning of the wireless terminal station device from the wireless base station device.

6. The positioning request device according to claim 5, wherein the reception unit receives a service provision request including positioning from the wireless terminal station device, notifies the control unit of the identification information of the wireless terminal station device from which the service provision request has been received and a request for positioning, and acquires a result of the positioning of the wireless terminal station device for performing service provision based on the position information to the owner of the wireless terminal station device from the control unit, and
the control unit specifies the wireless base station device to which the wireless terminal station device belongs on the basis of the identification information of the wireless terminal station device that has made the request for positioning notified of by the reception unit, transmits a positioning instruction and the identification information of the wireless terminal station device to the specified wireless base station device, and transmits a result of the positioning received from the wireless base station device to the reception unit.

7. The positioning request device according to claim 6, wherein, when the reception unit determines that it is necessary to provide a service based on the position information to the owner of the wireless terminal station device on the basis of information uploaded from the wireless terminal station device, the reception unit notifies the control unit of the identification information of the wireless terminal station device and the request for positioning, and acquires a result of the positioning of the wireless terminal station device from the control unit.

8. A non-transitory computer-readable medium having computer-executable instructions that, upon execution of the instructions by a processor of a computer, cause the computer to function as the positioning request device of claim 1.

* * * * *